US008488206B2

(12) United States Patent
Chida

(10) Patent No.: US 8,488,206 B2
(45) Date of Patent: Jul. 16, 2013

(54) COMMUNICATION DEVICE

(75) Inventor: Susumu Chida, Ichinomiya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 28 days.

(21) Appl. No.: 12/805,128

(22) Filed: Jul. 14, 2010

(65) Prior Publication Data

US 2010/0284042 A1 Nov. 11, 2010

Related U.S. Application Data

(62) Division of application No. 10/382,887, filed on Mar. 7, 2003, now Pat. No. 7,782,494.

(30) Foreign Application Priority Data

Mar. 11, 2002 (JP) ................................ 2002-065007
Mar. 12, 2002 (JP) ................................ 2002-066408
Mar. 22, 2002 (JP) ................................ 2002-081013

(51) Int. Cl.
*H04N 1/00* (2006.01)
*H04N 1/327* (2006.01)

(52) U.S. Cl.
USPC ........... 358/400; 358/439; 358/438; 358/434; 358/468; 358/435; 358/440; 358/402; 358/403; 358/407; 358/442; 358/1.15; 379/100.01; 379/100.02; 379/100.03; 379/100.17; 379/100.15

(58) Field of Classification Search
USPC ................. 358/400, 439, 434, 438, 468, 435, 358/440, 402, 403, 407, 442, 1.15; 379/100.01–100.17
See application file for complete search history.

(56) References Cited

U.S. PATENT DOCUMENTS 5,481,373 A * 1/1996 Ikeguchi et al. .............. 358/434
5,519,768 A * 5/1996 Moquin et al. ........... 379/100.01
5,642,409 A * 6/1997 Kotani et al. ............ 379/100.15
5,805,678 A * 9/1998 Okamoto et al. ........ 379/100.01
5,877,872 A * 3/1999 Nomura et al. ............... 358/468
6,191,869 B1 * 2/2001 Miura .......................... 358/442
6,654,148 B2 * 11/2003 Nishii ........................... 358/434
6,925,174 B2 * 8/2005 LeBlanc ................. 379/406.01
2001/0021040 A1 * 9/2001 Chida et al. ................... 358/435
2002/0080730 A1 * 6/2002 LeBlanc ....................... 370/286

FOREIGN PATENT DOCUMENTS

JP A-05-145695 6/1993
JP A-05-176153 7/1993
JP A-05-284249 10/1993
JP A-06-291883 10/1994
JP A-7-63170 3/1995

(Continued)

*Primary Examiner* — Vincent Rudolph
*Assistant Examiner* — Pawandeep Dhingra
(74) *Attorney, Agent, or Firm* — Oliff & Berridge, PLC

(57) ABSTRACT

When a facsimile device detects an audio signal via a CNG signal detection unit while detecting an OFF signal in a CNG signal during a telephone conversation, the facsimile device does not detect the audio signal as an OFF signal if the level of the detected audio signal is greater than a threshold and the frequency of the audio signal is within a predetermined audio frequency range. Accordingly, the facsimile device can reliably prevent a false detection of a noise that has a similar signal component to a CNG signal as a CNG signal. It is possible to prevent the facsimile machine from being automatically shifted to a facsimile receiving mode by the false detection of the noise.

10 Claims, 18 Drawing Sheets

FOREIGN PATENT DOCUMENTS

| | | |
|---|---|---|
| JP | A-07-074845 | 3/1995 |
| JP | A-07-203062 | 8/1995 |
| JP | A-07-231362 | 8/1995 |
| JP | A-8-336024 | 12/1996 |
| JP | A-9181847 | 7/1997 |
| JP | A-10-304124 | 11/1998 |
| JP | A-2000-278444 | 7/2000 |

* cited by examiner 1
29
25
CPU
RTC
15
ROM
16
RAM
17
17A
17B
17C
17D
EEPROM
18
RF UNIT FOR CORDLESS PHONE
19
CROSS-POINT SWITCH
21
NCU
23
30
HANDSET
22
AFE
11
MELODY IC
12
SPEAKER
13
FAX/DATA MODEM
28
28a
PANEL GA
5
RECORDING CIRCUIT
26
READING CIRCUIT
27
MIKE
4
BUTTONS
3
DISPLAY
2
MOTOR
6
THERMAL HEAD
7
SCANNER
8
SENSORS
9

42
RF UNIT FOR MAIN DEVICE
43
ROM
44
RAM
45
EEPROM
46
CPU
40
PANEL GA
41
DISPLAY
SPEAKER
37
MICROPHONE
38
BUTTONS
34

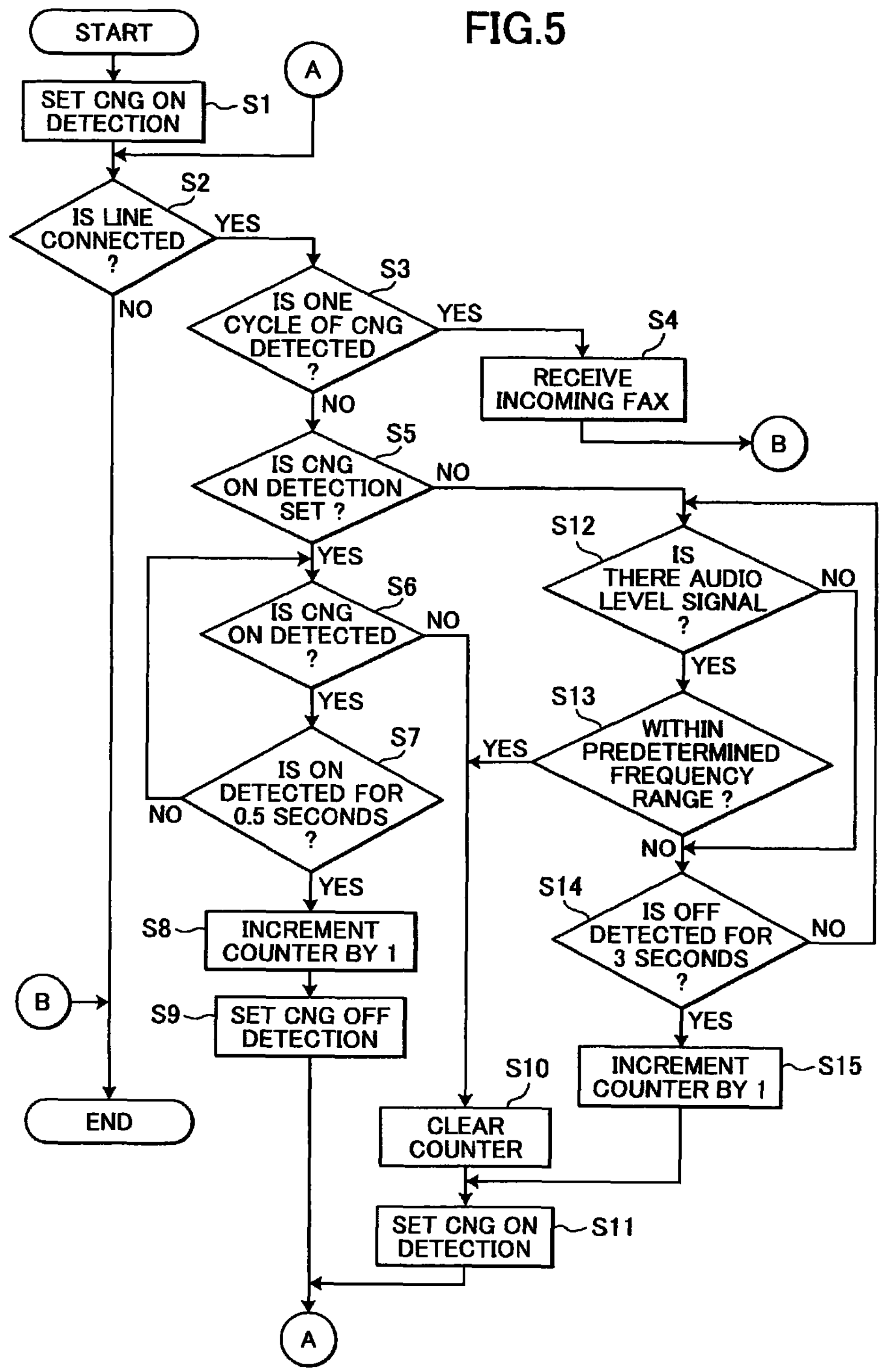
FIG.5
START
SET CNG ON DETECTION
S1
A
S2
IS LINE CONNECTED ?
YES
NO
S3
IS ONE CYCLE OF CNG DETECTED ?
YES
NO
S4
RECEIVE INCOMING FAX
B
S5
IS CNG ON DETECTION SET ?
NO
YES
S6
IS CNG ON DETECTED ?
NO
YES
S7
IS ON DETECTED FOR 0.5 SECONDS ?
NO
YES
S8
INCREMENT COUNTER BY 1
S9
SET CNG OFF DETECTION
S12
IS THERE AUDIO LEVEL SIGNAL ?
NO
YES
S13
WITHIN PREDETERMINED FREQUENCY RANGE ?
YES
NO
S14
IS OFF DETECTED FOR 3 SECONDS ?
NO
YES
S15
INCREMENT COUNTER BY 1
S10
CLEAR COUNTER
S11
SET CNG ON DETECTION
B
END
A RTC
ROM
RAM
EEPROM
RF UNIT FOR CORDLESS PHONE
NCU
CROSS-POINT SWITCH
HANDSET
CPU
FAX/DATA MODEM
AFE
MELODY IC
SPEAKER
PANEL GA
RECORDING CIRCUIT
READING CIRCUIT
MIKE
BUTTONS
DISPLAY
MOTOR
THERMAL HEAD
SCANNER
SENSORS
1
2
3
4
5
6
7
8
9
11
12
13
15
16
17
17a
17b
18
19
21
22
23
25
26
27
28
28a
29
30

RTC
ROM
RAM
EEPROM
RF UNIT FOR CORDLESS PHONE
NCU
CROSS-POINT SWITCH
HANDSET
CPU
FAX/DATA MODEM
AFE
MELODY IC
SPEAKER
PANEL GA
RECORDING CIRCUIT
READING CIRCUIT
MIKE
BUTTONS
DISPLAY
MOTOR
THERMAL HEAD
SCANNER
SENSORS
1
2
3
4
5
6
7
8
9
11
12
13
15
16
17
18
19
21
22
23
25
26
27
28
28a
29
30

RF UNIT FOR MAIN DEVICE
42
ROM
43
RAM
44
44a
EEPROM
45
CPU
46
PANEL GA
40
DISPLAY
41
SPEAKER
37
MICROPHONE
38
BUTTONS
34
36

1
29
25
CPU
RTC
15
ROM
16
RAM
17c
17
EEPROM
18
RF UNIT FOR CORDLESS PHONE
19
NCU
23
30
CROSS-POINT SWITCH
21
HANDSET
22
AFE
11
MELODY IC
12
SPEAKER
13
28a
FAX/DATA MODEM
28
PANEL GA
5
RECORDING CIRCUIT
26
READING CIRCUIT
27
MIKE
4
BUTTONS
3
DISPLAY
2
MOTOR
6
THERMAL HEAD
7
SCANNER
8
SENSORS
9

RF UNIT FOR MAIN DEVICE
42
ROM
43
RAM
44
EEPROM
45
CPU
46
PANEL GA
40
DISPLAY
41
SPEAKER
37
MICROPHONE
38
BUTTONS
34
36

COMMUNICATION DEVICE

This is a Division of application Ser. No. 10/382,887 filed Mar. 7, 2003, which claims the benefit of Japanese Patent Application Nos. 2002-065007 filed Mar. 11, 2002, 2002-066408 filed Mar. 12, 2002 and 2002-081013 filed Mar. 22, 2002. The disclosures of the prior applications are hereby incorporated by reference herein in their entirety.

BACKGROUND OF THE INVENTION

1. Field of the Invention

The present invention relates to a communication device that switches between a telephone function and facsimile function.

2. Description of Related Art

Recently, there has been introduced to the market a type of communication device, which has a main device connectable to an external telephone line and a subsidiary device connectable to the main device wirelessly. These devices enable users to receive/send a facsimile at the main device and make a phone call via both of the main device and the subsidiary device.

SUMMARY OF THE INVENTION

A user sometimes desires to receive a facsimile from a remote person while talking to the remote person by using the subsidiary device that is placed away from the main device. In such a case, the user has to come all the way to the main device and press a start button to receive the incoming facsimile.

Also some recent communication devices have a function that detects a CNG signal to activate a facsimile send/receive function while a telephone conversation is being executed. The communication device automatically shifts to a facsimile receiving mode when it detects a CNG signal sent from a remote device during a telephone conversation. Hence a user does not have to come all the way to the main device or to press a start button to receive the incoming facsimile.

However, because this communication device detects a CNG signal during a telephone conversation, the device possibly detects a noise that has a signal component similar to a CNG signal falsely as a CNG signal even when a remote device does not send a CNG signal to the subject device. In this case, the facsimile device shifts to a facsimile receiving mode during a telephone conversation, resulting in surprising the user and the remote person who are performing the telephone conversation.

It is an objective of the present invention to overcome the problems described above and to provide an improved communication device that prevents a false operation of shifting to a facsimile receiving mode automatically by erroneously detecting a signal component similar to a CNG signal as a CNG signal during a telephone conversation, but that can shift to a facsimile receiving mode automatically when it is appropriate to receive a facsimile.

In order to attain the above and other objects, the present invention provides a communication device, comprising: a facsimile receiving portion that detects a facsimile activation signal that is transmitted from a remote device via an external communication line while a telephone conversation is being executed with the remote device, and that switches from telephone function into facsimile function to execute facsimile receiving operation; and an error preventing portion that prevents the facsimile receiving portion from erroneously executing the facsimile receiving operation based on noise.

The facsimile receiving portion may include: a detecting portion that detects an ON state and an OFF state in the facsimile activation signal while the telephone conversation is being executed with the remote device; and a receiving portion that receives facsimile when the detecting portion detects the ON state of a predetermined period of time by a predetermined number of times and the OFF state of another predetermined period of time by another predetermined number of times. The error preventing portion may include: an audio signal detecting portion that detects an audio signal of a predetermined level and with a predetermined frequency while the detecting portion detects the OFF state in the facsimile activation signal; and a judging portion that determines that an error has occurred when the audio signal detecting portion detects the audio signal.

Or, the facsimile receiving portion may include: a facsimile activation signal detecting portion that detects the facsimile activation signal; a facsimile-activation data storing portion that stores facsimile-activation data when the facsimile activation signal detecting portion detects the facsimile activation signal while telephone communication is being executed with the remote device; and a receiving portion that receives facsimile based on the facsimile-activation data. The error preventing portion may include a judging portion that judges whether or not to read the facsimile-activation data from the facsimile-activation data storing portion. The receiving portion may receive facsimile based on the facsimile-activation data when the judging portion determines to read the facsimile-activation data from the facsimile-activation data storing portion.

Or, the facsimile receiving portion may include: a facsimile activation signal detecting portion that detects the facsimile activation signal; a communicating portion that communicates with the remote device; and a receipt-controlling portion that enables the communicating portion into a state, in which the communicating portion is capable of receiving facsimile when the facsimile activation signal detecting portion detects the facsimile activation signal. The error preventing portion may include: a non-detection mode setting portion that sets the facsimile activation signal detecting portion in a non-detection mode, in which the facsimile activation signal detecting portion is disabled to detect the facsimile activation signal while telephone communication is being executed with the remote device; an instruction input portion that receives a user's instruction, while telephone communication is being executed with the remote device, the user's instruction being for bringing the facsimile activation signal detecting portion from the non-detection mode into a detection mode, in which the facsimile activation signal detecting portion is enabled to detect the facsimile activation signal; and a detection mode setting portion that sets the facsimile activation signal detecting portion into the detection mode upon receipt of the user's instruction Or, the facsimile receiving portion may include: a facsimile activation signal detecting portion that detects the facsimile activation signal; a communicating portion that communicates with the remote device; and a receipt-controlling portion that enables the communicating portion into a state, in which the communicating portion is capable of receiving facsimile when the facsimile activation signal detecting portion detects the facsimile activation signal. The error preventing portion may include: an instruction input portion that receives a user's instruction, while telephone communication is being executed with the remote device, the user's instruction being for bringing the facsimile activation signal detecting portion into a state, in which the facsimile activation signal detecting portion is capable of detecting the facsimile activation signal without being influenced by noise; and a noise-input preventing portion that prevents the user's voice from being inputted in response to input of the user's instruction.

BRIEF DESCRIPTION OF THE DRAWINGS

The above and other objects, features and advantages of the invention will become more apparent from reading the following description of the preferred embodiments taken in connection with the accompanying drawings in which:

FIG. 5 is a flowchart showing a CNG signal detection process executed by the main device according to the first embodiment;

DETAILED DESCRIPTION OF THE PREFERRED EMBODIMENTS

Figure 1:
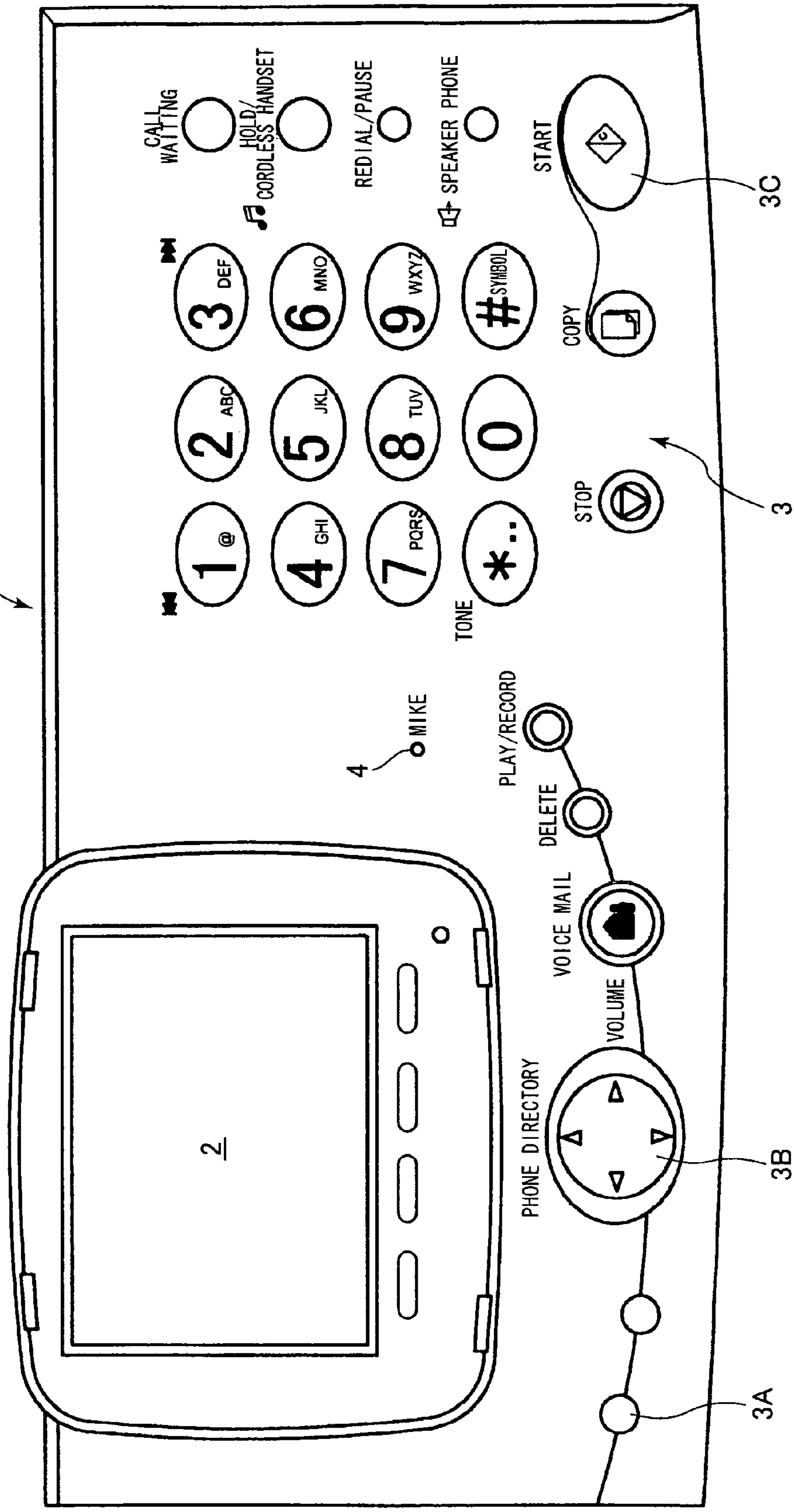
FIG. 1 is a plan view showing an external configuration of a main device of a facsimile device according to a first embodiment of the present invention.

A communication device according to preferred embodiments of the present invention will be described while referring to the accompanying drawings wherein like parts and components are designated by the same reference numerals to avoid duplicating description.

First Embodiment

Next, a communication device according to a first embodiment of the present invention will be described with reference to FIGS. 1 through 7.

Figure 2:
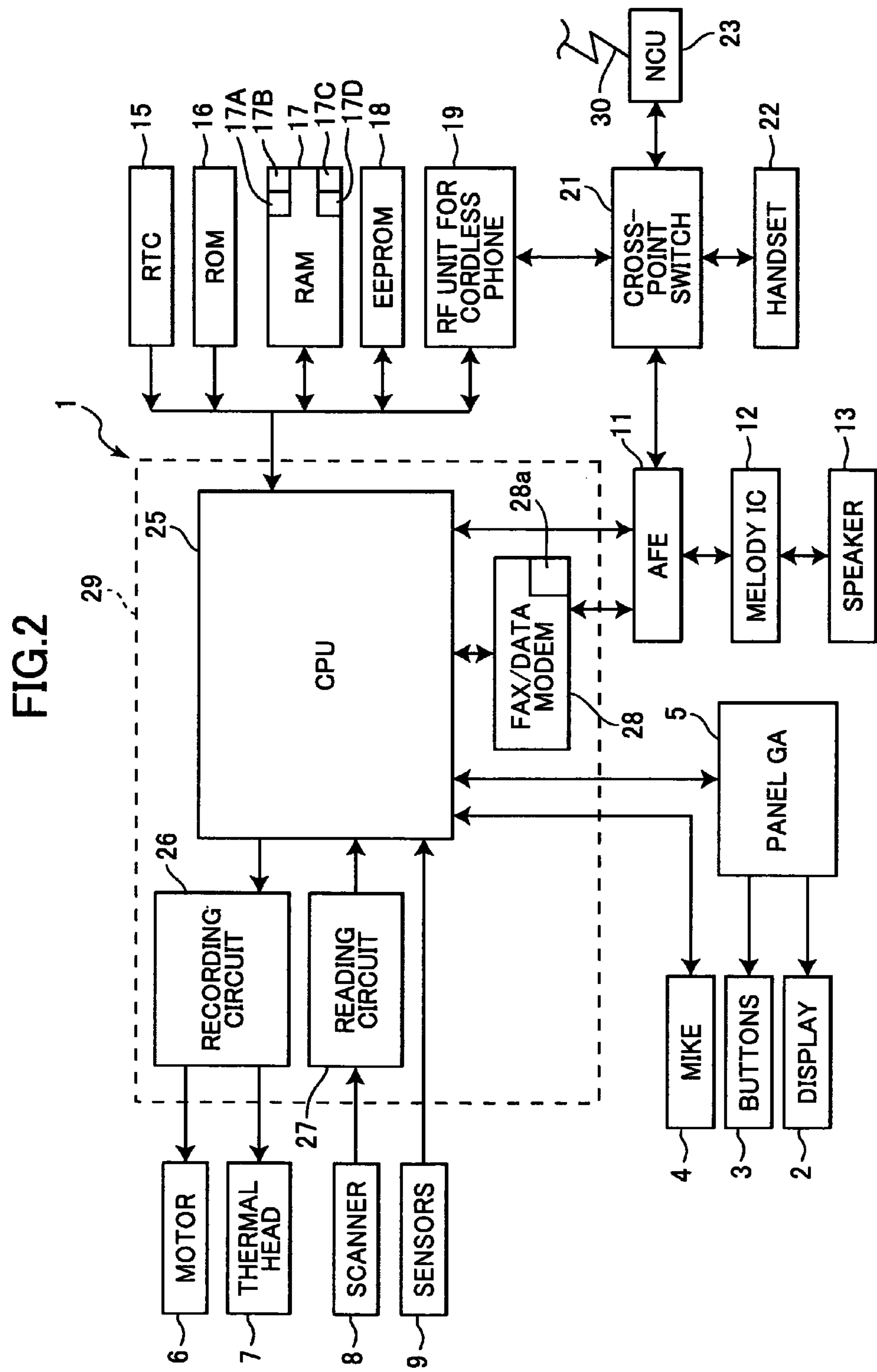
FIG. 2 is a block diagram showing an electrical configuration of the main device of FIG. 1.
Figure 3:
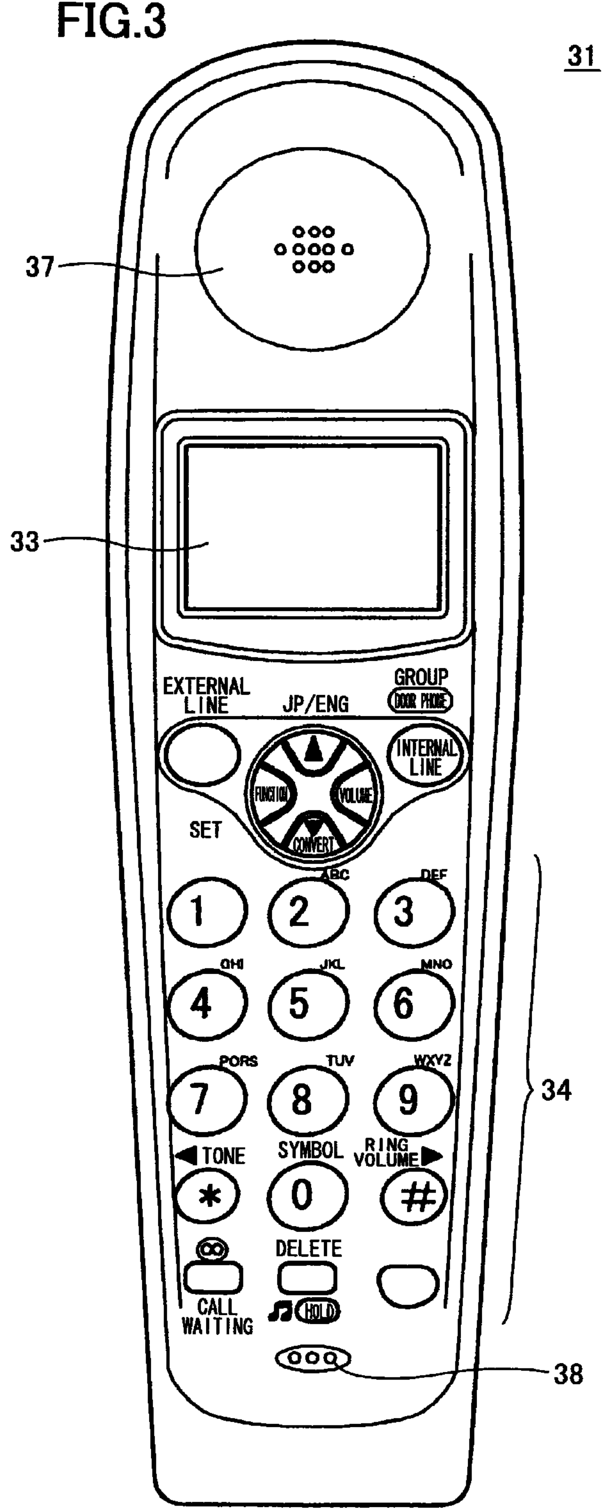
FIG. 3 is a plan view showing an external configuration of a subsidiary device (cordless handset) of the facsimile according to the first embodiment.

The communication device of the first embodiment is a facsimile device, which includes a main device 1 shown in FIG. 1 and a subsidiary device (cordless handset) 31 shown in FIG. 3. The main device 1 is connectable to an external communication line 30 (FIG. 2), and has both facsimile function (facsimile transmission function and facsimile reception function) and a telephone function. The subsidiary device 31 is wirelessly connectable with the main device 1 and has a telephone function.

As shown in FIG. 1, a display 2 and a plurality of buttons (keys) 3 are provided on the center of the main device 1. Although not shown in the drawing, the main device 1 is configured as being capable of discharging a paper printed with an image received by a facsimile reception operation. The main device 1 is configured also as being capable of receiving a document to be read by the main device 1 and to be transmitted to a remote destination by a facsimile transmission.

The display 2 is an LCD. The display 2 is for showing various messages including: a message "Connected" informing a user that a line between the main device 1 and a remote device is connected; a message "Disconnected" informing a user that the line is disconnected; a message "Fax will come. Hang up the handset if you wish to start fax reception."; and the like. The display 2 also shows a predetermined standby screen and the like.

The buttons 3 include: ten-keys that allow a user to dial the telephone number of a remote destination; and various kinds of function buttons for different operations, such as a voice mail button for setting/resetting an answering mode, a speaker phone button for playing a message with a speaker, a hold/cordless handset button to hold a line or to switch to the cordless handset 31; an e-mail button 3A for operating e-mails; arrow keys (scroll keys) 3B for moving a cursor on the display 2 upwardly, downwardly, leftwardly, and rightwardly; and a start button 3C for performing operations related to sending and receiving a facsimile. The main device 1 is also provided with a microphone 4 for inputting a user's voice.

As shown in FIG. 2, the main device 1 has: the display 2, the buttons, a panel GA (Gate Array) 5, the microphone 4, a motor 6, a thermal head 7, a scanner 8, sensors 9, an AFE (Analog Front End) 11, a melody IC (Integrated Circuit) 12, a speaker 13, a RTC (Real Time Clock) 15, a ROM 16, a RAM 17, an EEPROM 18, a RF (radio frequency) unit 19 for communication with the cordless handset 31, a cross-point switch 21, a handset 22, a NCU (network control unit) 23, a CPU 25, a recording circuit 26, a reading circuit 27, and a FAX/Data modem 28. A public telephone line 30 is connected to the NCU 23 as an external telephone line.

The CPU 25 is for controlling the whole operations of the main device 1 and the cordless handset 31. The CPU 25 is connected to the recording circuit 26, reading circuit 27, panel GA 5, microphone 4, FAX/Data modem 28, AFE 11, RTC 15, ROM 16, RAM 17, EEPROM 18, and RF unit 19. The FAX/Data modem 28 has a CNG signal detection unit 28*a* for detecting an arrival of a CNG signal from a remote device. The CNG signal detection unit 28*a* can detect an arrival of a CNG signal by activating a call-waiting function to detect a third-person's incoming call via the public telephone line 30, NCU 23, cross point switch 21 and AFE 11 while a telephone communication is being executed. The CPU 25, recording circuit 26, reading circuit 27, panel GA 5, and FAX/Data modem 28 are provided in one IC chip 29.

The recording unit 26 is controlled by the CPU 25 to control operations of the motor 6 and thermal head 7, which are provided in a printer portion in the main device 1. The motor 6 serves to supply a sheet of thermal printing paper into the main device 1 and to discharge a printed thermal paper out of the main device 1. The thermal head 7 serves to print images on a thermal printing paper. In place of the thermal head, an ink-jet head or a laser engine may be employed.

The reading circuit 27 is controlled by the CPU 25 to control operations of the scanner 8. The scanner 8 is for reading texts or images on a document and for supplying text data or image data to the reading circuit 27.

The sensors 9 include: a printing paper detecting sensor for detecting whether printing papers are set, a handset detecting sensor for detecting whether or not the handset 22 is in an on-hook condition, and other various sensors provided in the main device 1.

The panel GA 5 serves as an interface to exchange data signals among the buttons 3, the display 2, and the CPU 25. The Fax/Data modem 28 modulates/demodulates various information, such as e-mail data and facsimile data. The AFE 11 is for sampling data signals between the melody IC 12 and the cross point switch 21 and the CPU 25 and the FAX/Data modem 28.

The melody IC 12 is for generating a ringing tone and for amplifying the ringing tone by activating the speaker 13. The RTC 15 measures the current date/time and sends data of the date/time to the CPU 25. The ROM 16 stores various control programs for the CPU 25 to execute various control operations. The ROM 16 also stores a control program that is executed when an input signal indicative of an incoming call from a third party by a call waiting function is received.

The RAM 17 provides a work space for the CPU 25 and a memory space, in which various data is developed.

The EEPROM 18 stores telephone numbers, fax numbers, and e-mail addresses of several destinations. The RF unit 19 is controlled by the CPU 25 to send/receive control data signals and audio signals wirelessly to/from the cordless handset 31 in order to connect the codeless telephone 31 to the main device 1 via a wireless network.

The cross point switch 21 is for switching and exchanging data signals in order to transport them among the RF unit 19, NCU 23, handset 22, and AFE 11.

The NCU 23 is connected to the public telephone line 30 and performs network control. The NCU 23 responds to a calling signal from the public telephone line 30 as well as sends a dialing signal to the public telephone line 30.

As shown in FIG. 3, the cordless handset 31 has a speaker 37, LCD display 33, buttons 34, and a microphone 38. The buttons 34 include: number buttons, a hook button (not shown) for bringing the cordless handset 31 between an on-hook condition and an off-hook condition, and an operation key for a call waiting function.

Figure 4:
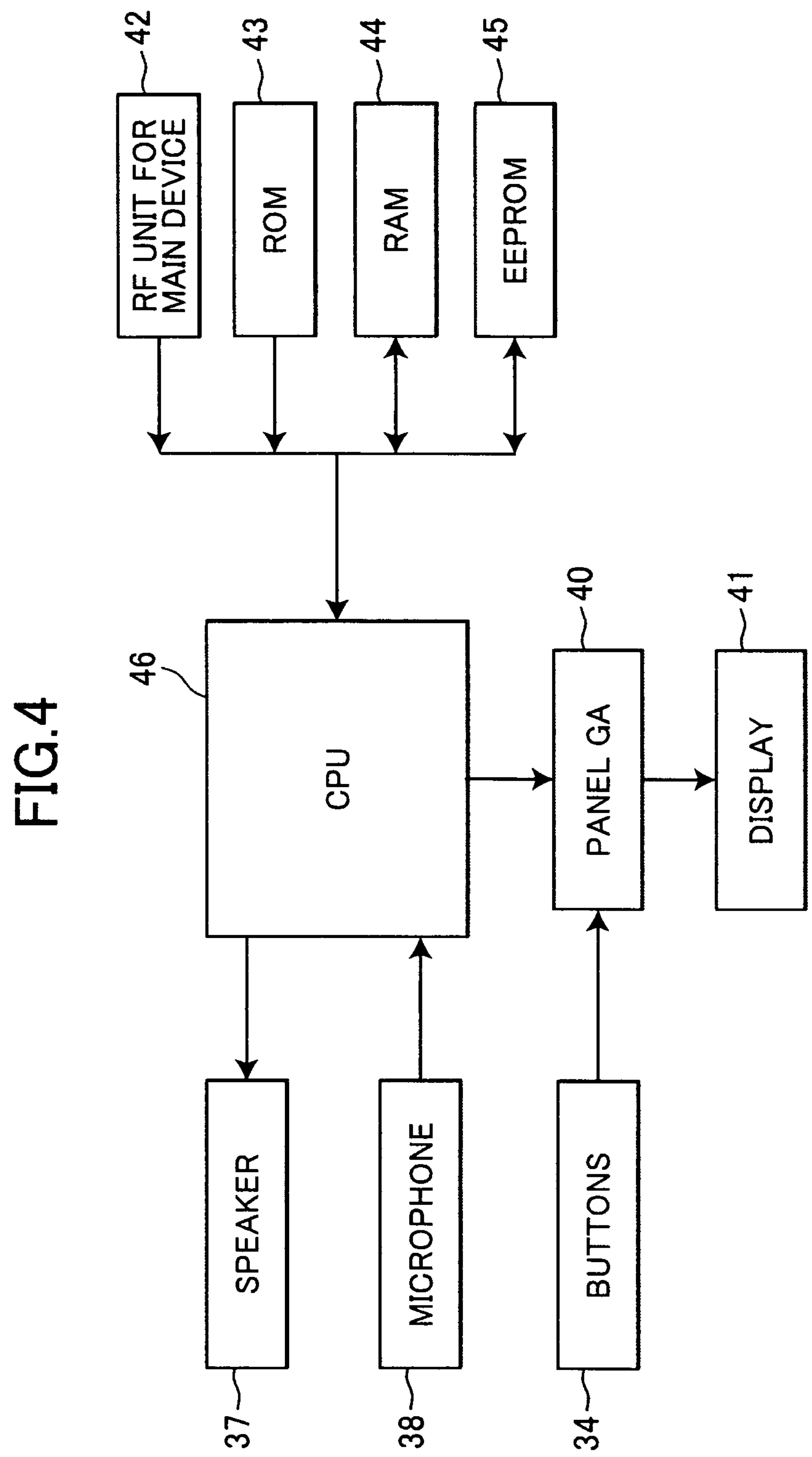
FIG. 4 is a block diagram showing an electrical configuration of the subsidiary device of FIG. 3.

As shown in FIG. 4, the cordless handset 31 has the speaker 37, microphone 38, buttons 34, panel GA (Gate Array) 40, display 41, RF (Radio Frequency) unit for communication with the main device 42, ROM 43, RAM 44, EEPROM 45, and CPU 46.

The CPU 46 is for controlling the whole operations of a call via the cordless handset 31. The ROM 43 stores various control programs for the CPU 46 to execute various controls. The ROM 43 also stores a control program executed upon receiving an input signal indicative of an incoming call from a third party via a call waiting function.

The RAM 44 provides a work space for the CPU 46 and a memory space, in which various data is developed. The EEPROM 45 stores phone numbers, fax numbers, and e-mail addresses of several destinations. The RF unit 42 is for sending and receiving data signals as well as audio signals to/from the main device 1 via a wireless network under a control of the CPU 46.

With the above-described configuration, the main device 1 has both of a telephone function and a facsimile function (facsimile transmission function and facsimile reception function). The main device 1 can switch between its telephone function and its facsimile function. The cordless handset 31 performs its telephone function by being wirelessly communicated with the main device 1.

In the main device 1, the CNG signal detection unit **28*a* detects a CNG signal sent from the remote device via the public telephone line 30. It is noted that the CNG signal has a radio frequency of 1,100 Hz (1.1 KHz), and has one cycle, in which an ON state (ON signal) first continues for 0.5 second, an OFF state (OFF signal) next continues for 3.0 seconds, and another ON state (ON signal) next continues for 0.5 second. Accordingly, it is known that a CNG signal has arrived when one cycle of ON-OFF-ON in the CNG signal has been detected appropriately. It is also noted that according to the present embodiment, the CNG signal detection unit 28*a* is being activated always even while a telephone conversation is being executed between the main device 1 or the cordless handset 31** and a remote device.

Especially, according to the present embodiment, in the main device 1, the RAM 17 includes: a counter 17A, a counter 17B, a timer 17C, and a memory unit 17D. The counter 17A is used during a CNG signal detection process of FIG. 5 to be described later. The counter 17A is for counting the total number of times the facsimile device 1 has appropriately detected one state (ON or OFF state) in a CNG signal. The memory unit 17D is used during an automatic threshold setting process of FIG. 6 to be described later. The memory unit 17D is for storing the values of an audio level signal A and a silent level signal B that are detected during the automatic threshold setting process.

The counter 17B and the timer 17C are used during a modified automatic threshold setting process shown in FIG. 7 to be described later. The memory unit 17D is used also during the modified automatic threshold setting process of FIG. 7. The counter 17B is for counting the number of times Ac and Bc, indicative of the number of times when audio level signals A and silent level signals B have been detected. The timer 17C is for measuring time. The memory unit 17D is used for storing an audio level total value At and a silent level total value Bt.

According to the present embodiment, the main device 1 executes a CNG signal detection process as shown in FIG. 5.

During the CNG signal detection process, first, in S1, an ON-signal detection setting is executed to detect an ON signal in a CNG signal. In S2, it is judged whether or not the line is connected. If the line is connected and a telephone conversation is being performed with a remote device by using the main device 1 or the cordless handset 31 (S2: YES), the program proceeds to S3. On the other hand, if the line is not connected and no telephone conversation is executed (S2: NO), the process ends.

In S3, it is judged whether or not one cycle of CNG signal has been appropriately detected. More specifically, it is judged whether or not the value of the counter 17A reaches the number "three (3)". The value of the counter 17A indicates the total number of times the ON or OFF state in a CNG signal has been appropriately detected. By judging whether or not the value of the counter 17A reaches the number "three (3)", it is possible to judge whether or not an ON signal (ON state) of a duration of 0.5 second, an OFF signal (OFF state) of a duration of 3 seconds, and another ON signal (ON state) of 0.5 second of a CNG signal have been consecutively detected appropriately. In other words, it is possible to judge whether or not one cycle of a CNG signal has been detected appropriately.

If the value of the counter 17A reaches the number "three (3)" (yes in S3), the facsimile device 1 is shifted in S4 into a facsimile reception mode, wherein the facsimile device 1 is capable of receiving an incoming facsimile document transmitted from the remote device. Then, the process ends and moves to another process.

On the other hand, if the value of the counter 17A does not yet reach the number "three (3)" (no in S3), it is judged in S5 whether or not the ON-signal detection setting is now being set. If the ON-signal detection setting is being set (S5: YES), it is judged in S6 whether or not an ON signal in the CNG signal has been detected. If an ON signal is detected (S6: YES), it is further judged in S7 whether or not the ON signal has lasted for 0.5 second. If the ON signal has not yet continued for 0.5 second (S7: NO), the program returns to S6. On the other hand, if the ON signal has lasted for 0.5 second (S7: YES), then in S8 the value of the counter 17A is incremented by one (1). In S9, an OFF-signal detection setting is executed to detect an OFF signal in the CNG signal. Then, the program returns to S2.

On the other hand, if an ON signal is not detected (S6: NO), it is determined in S10 that an error has occurred and the counter 17A is cleared. This is because an ON signal is not detected even though the ON-signal detection has been set in S1. Then in S11, another setting is conducted to try detecting an ON signal again in the same manner as in S1. Then, the program returns to S2.

On the other hand, if the ON-signal detection setting in not being set (S5: NO), it is known that the OFF-signal detection setting is now being set. Accordingly, in S12, it is judged whether or not an audio level signal has been detected. The decision is made by comparing the level of an audio signal, detected via the CNG signal detection unit 28*a*, with a threshold, which is being presently stored in the EEPROM 18.

If the level of the incoming audio signal is greater than the threshold (S12: YES), it is determined that the audio level signal has arrived, and therefore it is judged in S13 whether or not the frequency of the audio level signal is within a predetermined audio frequency range, that is, between 0.3 KHz and 3.4 KHz, which corresponds to an audio frequency of a human's voice.

If the frequency of the audio level signal is within the predetermined audio frequency range (S13: YES), then it is determined that an error has occurred, in order to avoid falsely detecting the audio level signal as an OFF signal in a CNG signal. Accordingly, the program proceeds to S10, wherein the counter 17A is cleared. Then, in S11, the ON-signal setting is executed in order to try detecting an ON signal again. Then, the program returns to S2.

On the other hand, if the frequency of the audio level signal is not within the predetermined audio frequency range (S13: NO), it is determined that an OFF signal in a CNG signal is now being detected properly. Accordingly, it is judged in S14 whether or not the OFF signal has lasted for three seconds. If the OFF signal has not yet continued for three seconds (S14: NO), the program returns to S12. If the OFF signal has lasted for three seconds (S14: YES), then the value of the counter 17A is incremented by one in S15. Then, the program proceeds to S11, in which another ON-signal setting is made to detect another ON signal. Then, the program returns to S2.

By executing the process of FIG. 5, when a CNG signal properly arrives during telephone conversation via the main device 1 or the cordless handset 31, the main device 1 is automatically shifted to a facsimile receiving status in a manner described below.

Because a telephone conversation is being executed (S1, S2: YES), an ON signal in the CNG signal is first detected (S3: NO, S5: YES, S6: YES). The ON signal lasts for 0.5 second (S7: YES). Then, the value of the counter 17A is incremented by one (S8). The OFF-signal detection is set (S9), and returns to S2. The value of the counter 17A at this time is "1".

Next, an OFF signal in the CNG signal is detected (S2: YES, S3: NO, S5: NO). If the level of an audio signal detected via the CNG signal detection unit 28*a* is smaller than the threshold stored in the EEPROM 18 (S12: NO), it is determined that the audio signal is a silence level signal, and therefore the program proceeds to S14. Even if the level of the audio signal is greater than the threshold (S12: YES) and therefore the audio signal is an audio level signal, if the frequency of the audio level signal is not within the predetermined audio frequency range (S13: NO), the program proceeds to S14. If the OFF signal has lasted for three seconds (S14: YES), then the value of the counter 17A is incremented by one (S15), and another setting is made in S11 to detect another ON signal. Then, the program returns to S2. The value of the counter 17A is "two" at this time.

Then, another ON signal is detected (S3: NO, S5: YES, S6: YES). After the ON signal has lasted for 0.5 seconds (S7: YES), the value of the counter 17A is incremented by one (S8). The process then proceeds to S9 and returns to S2. The value of the counter 17A is "3" at this time.

Because the value of the counter 17A is now "3", it is determined that one cycle of CNG signal has been appropriately detected (S2: YES, S3: YES). Accordingly, the main device 1 is shifted to a status capable of receiving an incoming facsimile (S4).

On the other hand, while an OFF signal is being detected during a telephone conversation (S1, S2: YES, S3: NO, S5: NO), if the level of the audio signal detected via the CNG signal detection unit 28*a* is greater than the threshold stored in the EEPROM 18 (S12: YES) and if the frequency of the audio signal is within the predetermined audio frequency range (S13: YES), it is determined that an error has occurred, in order to avoid detecting the human's voice signal erroneously as an OFF signal. Accordingly, the counter 17A is cleared in S10, and the program proceeds to S11, and returns to S2.

In this way, if an audio level signal with a relatively high level and with a human's voice frequency arrives while an OFF signal is being detected during the telephone conversation via the main device 1 or the cordless handset 31, the main device 1 is not automatically shifted to the facsimile reception state, but it is determined that an error has occurred during the OFF signal detection. Accordingly, the main device 1 tries performing its detection again.

According to the present embodiment, the threshold is set automatically in the EEPROM 18 in a manner described below while telephone conversation is being executed.

Figure 6:
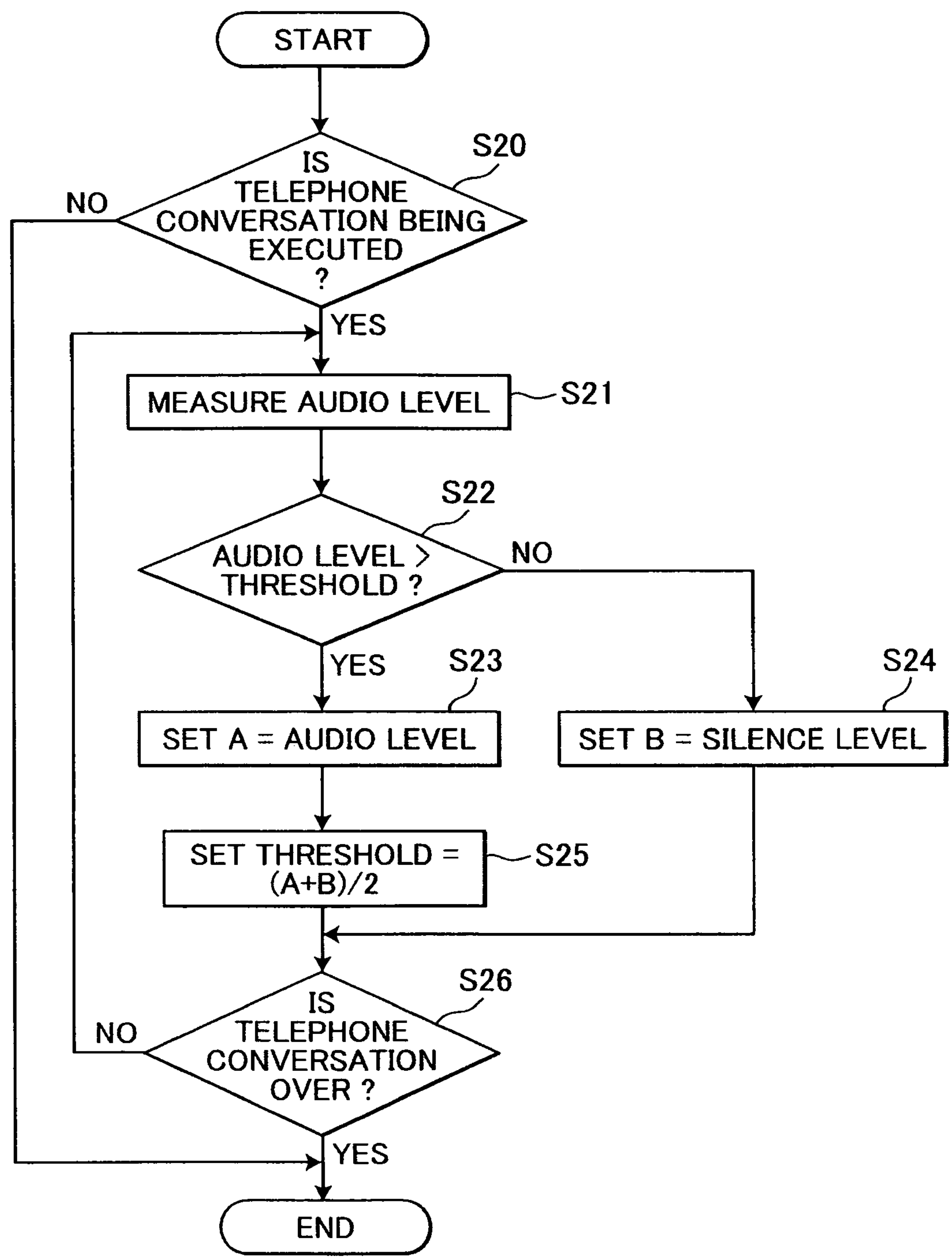
FIG. 6 is a flowchart showing an automatic threshold setting process executed by the main device according to the first embodiment.

A threshold-setting process of FIG. 6 is executed repeatedly while the line is being connected and a telephone conversation is being executed by the main device 1 or the cordless handset 31.

As show in FIG. 6, it is first judged in S20 whether or not a telephone conversation is being executed between the main device 1 or the cordless handset 31 and a remote device. If a telephone conversation is not being executed (S20: NO), then the automatic threshold setting process ends. On the other hand, if a telephone conversation is being executed (S20: YES), then in S21, the level or strength of an audio signal detected via the CNG signal detection unit 28*a* is measured.

In S22, it is judged whether or not the measured level of the audio signal is greater than a threshold that is presently stored in EEPROM 18. It is noted that the value of the threshold initially stored in EEPROM 18 is equal to a value of an average level of audio signals normally detected by the CNG signal detection unit 28*a*.

If the measured level of the detected audio signal is greater than the threshold (S22: YES), then in S23, the level of the audio signal is stored as audio level signal A in the memory unit 17D, and the program proceeds to S25.

On the other hand, if the measured level of the detected audio signal is smaller than or equal to the threshold (S22: NO), then in S24, the level of the audio signal is stored as silence level signal B in the memory unit 17D, and the program proceeds to S25. The silence level signal B indicates the level of a silent signal (audio signal in a silent period).

In S25, the average value of signals A and B, which have been stored in the memory unit 17D in the previous step, is calculated. The calculated average value is stored in the EEPROM 18 as a new threshold. Then, it is judged in S26 whether or not the telephone conversation is over. If the telephone conversation is not over (S26: NO), the program returns to S21. On the other hand, if the conversation is over (S26: YES), then the process ends.

In this way, the threshold that is used during the decision of S12 during the CNG detection process of FIG. 5 is automatically calculated and stored in the EEPROM 18.

As described above, according to the present embodiment, when the facsimile device 1 detects an audio signal via the CNG signal detection unit 28*a* while detecting an OFF signal in a CNG signal (S1, S1: YES, S5: NO) during a telephone conversation, the facsimile device 1 does not detect the audio signal as an OFF signal if the level of the detected audio signal is greater than the threshold stored in the EEPROM 18 (S12: YES) and the frequency of the audio signal is within the predetermined audio frequency range (S13: YES). Accordingly, the facsimile device 1 can reliably prevent a false detection of a noise that has a similar signal component to a CNG signal as a CNG signal. It is possible to prevent the facsimile machine 1 from being automatically shifted to a facsimile receiving mode by the false detection of noise.

Still, the facsimile device 1 can reliably be automatically shifted into the facsimile reception mode by detecting an OFF signal in an CNG signal in the case where the level of the audio signal detected via the CNG signal detection unit 28*a* is smaller than the threshold stored in the EEPROM 18 (S13: YES) or in the case where the frequency of the audio signal is not within the predetermined audio frequency range (S13: NO).

As described above, according to the present embodiment, it is determined that an error occurs when an audio signal, whose level is greater than the threshold and whose frequency is within the predetermined audio frequency range, is detected while an OFF state of an CNG signal is being detected. Accordingly, when noise having a similar signal component to a CNG signal is detected while an OFF state of the CNG signal is being detected, if the noise has the certain level or more and a frequency within the predetermined range, it is possible to prevent the noise from being erroneously detected as a CNG signal. Even if the audio signal (noise) has the frequency of 1,100 Hz the same as that of CNG signal, if the level of the audio signal is smaller than the threshold, it is determined that no error occurs. Similarly, even if the level of the noise is greater than the threshold, if the frequency of the noise is not within the predetermined range, it is determined that no error occurs.

The OFF state can be appropriately detected when the audio signal level is smaller than or equal to the threshold. In other words, the OFF state can be detected even when a complete silence is not detected but some relatively-small audio signal is detected. The OFF state can therefore be detected even when the user and a remote person continue their conversation via the telephone communication.

Because the predetermined frequency range is equal to the human's voice frequency range, when an audio signal originated from the telephone conversation is detected during the OFF signal detection, it is possible to prevent the audio signal from being erroneously detected as a CNG signal.

It is possible to easily determine the level of the audio signal by simply comparing the audio signal level with the threshold in the EEPROM 18.

Modifications of First Embodiment

In the above description, the average value of the signals A and B stored in the memory unit 17D is set as a threshold during the threshold automatic setting process of FIG. 6. However, any value between the signals A and B can be set as the threshold.

Figure 7:
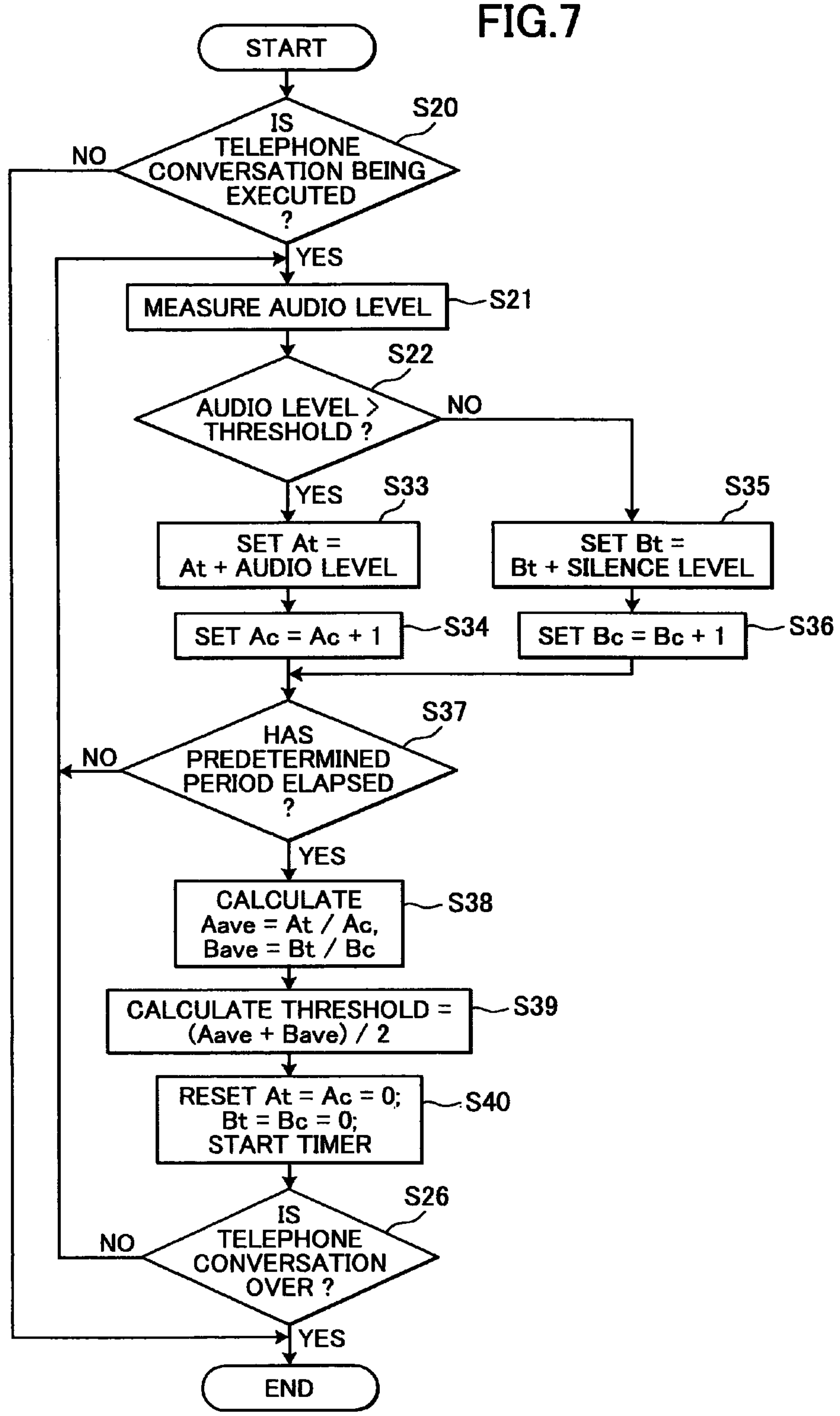
FIG. 7 is a flowchart showing a modification of the automatic threshold setting process of the first embodiment.

The threshold automatic setting process of FIG. 6 may be modified as shown in FIG. 7 considering a potential problem that the value of the signal A will possibly become a large value temporarily and will give a too large influence onto the threshold.

The process of FIG. 7 is the same as that of FIG. 6 except that processes of S33-S40 are executed in place of the processes of S23-S25.

More specifically, if the measured level of the detected audio signal is greater than the threshold (S22: YES), it is known that the detected audio signal is an audio level signal A. Accordingly, in S33, the measured level of the detected audio signal (audio level signal A) is added to an audio level total value At, which is already stored in the memory unit 17D, and a resultant total value At is stored in the memory unit 17D. In S34, the count number Ac, which is set in the counter 178 as indicative of the total number of times the audio level signal A has been detected, is incremented by one. Then, the program proceeds to S37.

On the other hand, if the measured level of the detected audio signal is smaller than or equal to the threshold (S32: NO), it is known that the detected audio signal is a silent level signal B. Accordingly, in S35, the measured level of the detected audio signal (silence level signal B) is added to a silent level total value Bt, which is already stored in the memory unit 17D, and a resultant total value Bt is stored in the memory unit 17D. In S36, the count number Bc, which is set in the counter 17B as indicative of the number of times Bc the silent signal B has been detected, is incremented by one. Then, the program proceeds to S37.

In S37, it is judged whether or not a predetermined period of time has elapsed by checking the timer 17C that has started measuring time at the latest-executed step S40 (to be described later). If the predetermined period of time has not yet elapsed (S37: NO), then the program returns to S21 to measure an audio signal again. In this way, the audio signal is measured repeatedly during the predetermined period.

On the other hand, when the predetermined period has passed (S37: YES), the program proceeds to S38.

In S38, an average value Aave of the audio level signals A is calculated by dividing the total value At, which is now stored in the memory unit 17D, by the count number Ac, which is now stored in the counter 17B. Similarly, an average value Bave of the silent level signals B is calculated by dividing the total value Bt, now stored in the memory unit 17D, by the count number Bc, now stored in the counter 17B.

In S39, an average value of the average value Aave of the audio level signals A and the average value Bave of the silent level signals B is calculated. The resultant average value of the two averages is stored in the EEPROM 18 as a new threshold. It is noted that also according to this modification, the value of the threshold initially stored in EEPROM 18 is equal to a value of an average level of audio signals normally detected by the CNG signal detection unit 28*a*.

Then in S40, the total value At, the count number Ac, the total value Bt, and the count number Bt are all reset to zero (0). At the same time, the timer 17C starts measuring time. Then, the program proceeds to S26.

In this way, the threshold used in S12 during the CNG detection process of FIG. 5 is calculated automatically and stored in the EEPROM 18.

According to the automatic threshold setting process of this modification, even when an unusual sound happens and the value of the audio level signal A becomes temporarily large, or some changes happen in the silent level signal B, the threshold can be appropriately calculated by: calculating the total values At and Bt for the signals A and B, respectively; dividing the total values At and Bt by the numbers Ac and Bc of the counted times, respectively, to obtain the average values Aave and Bave; and calculating the average value of the average values Aave and Bave; and setting the resultant average value as a threshold. Accordingly, it is possible to set an appropriate threshold that corresponds to characteristics of the voice of facsimile users and characteristics of a place where the facsimile 1 is placed.

Second Embodiment

Figure 8:
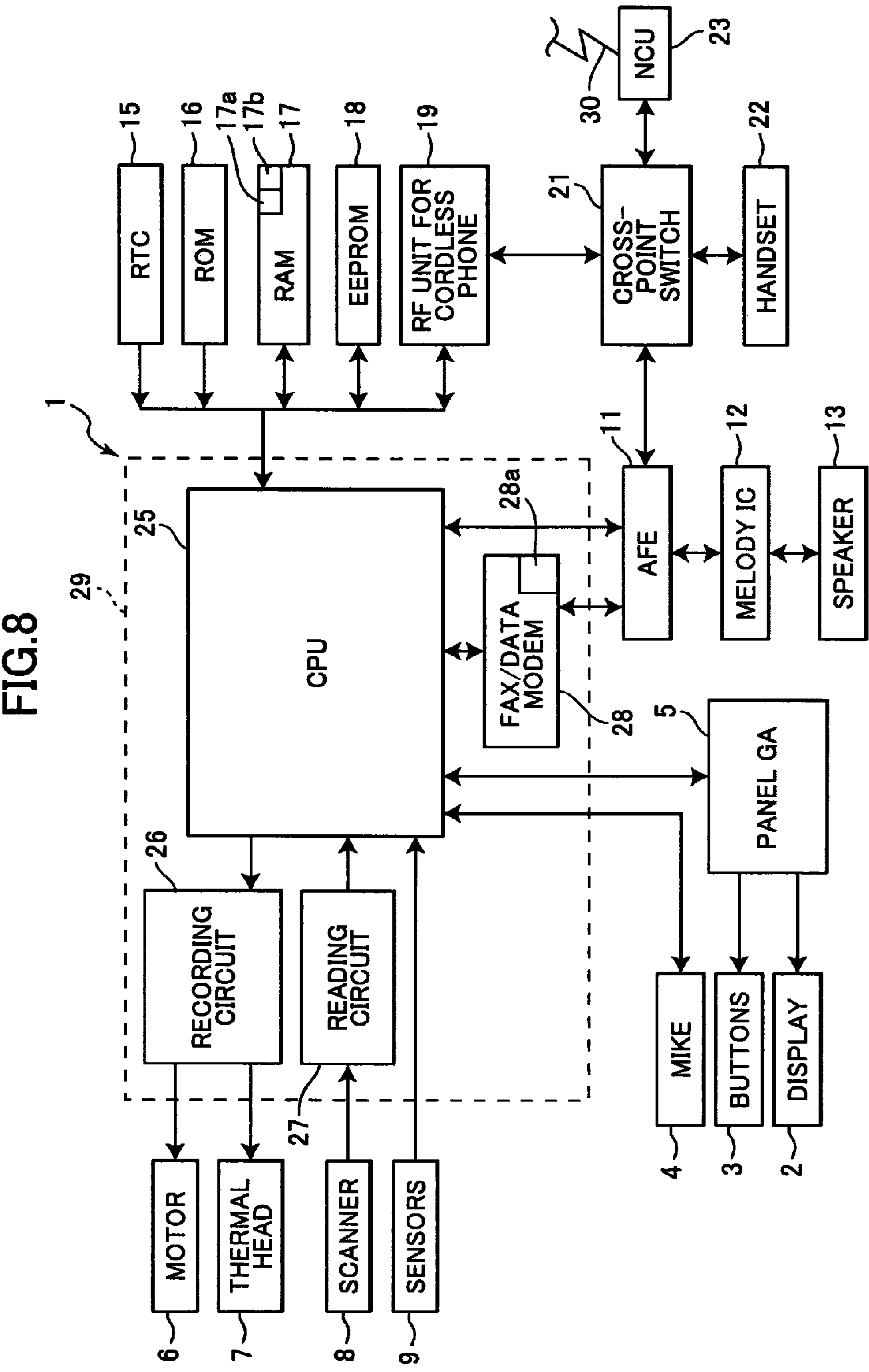
FIG. 8 is a block diagram showing an electrical configuration of the main device according to a second embodiment.

Next, a communication device according to a second embodiment of the present invention will be described with reference to FIGS. 8 through 10.

The main device 1 and the cordless handset 31 of the second embodiment are the same as those of the first embodiment except for the points described below:

According to the first embodiment, the RAM 17 on the main device 1 is provided with the counters 17A, 17B, the timer 17C, and the memory portion 17D. However, according to the present embodiment, the RAM 17 is provided with a CNG-detected timer 17*a*, and a CNG-non-detected timer 17*b* as shown in FIG. 8.

Especially, according to the present embodiment, a CNG-detected flag (facsimile activation data) is set in the RAM 17 when a CNG signal is detected via the public telephone line 30. The CNG-detected flag is one bit data. When the CNG-detected flag is set in the RAM 17, it is known that a CNG signal has been detected. When the CNG-detected flag is not set in the RAM 17, it is known that a CNG signal has not yet been detected. It is noted the CNG-detected flag will be set even when the facsimile device 1 falsely detects, as a CNG signal, a noise that has a signal component similar to a CNG signal.

The CNG-detected timer 17*a* is for measuring a predetermined period of time T1. The timer 17*a* starts measuring time when a CNG signal has been detected. The timer 17*a* starts measuring time even when a noise has been falsely detected as a CNG signal. The timer 17*a* performs time measuring operation using data inputted from the RTC 15.

The CNG-non-detected timer 17*b* is for measuring another predetermined period of time T2. The timer 17*b* starts measuring time when the CNG-detected flag has not been set when a user of the facsimile device 1 places his/her handset 22 into an on-hook condition or depresses the hook button on the cordless handset 31 to indicate his/her desire to terminate his/her telephone conversation with a remote device.

The NCU 23 can detect whether or not the line is disconnected by a remote device to terminate a telephone conversation between the facsimile device 1 or the cordless handset 31 and the remote device.

Figure 9:
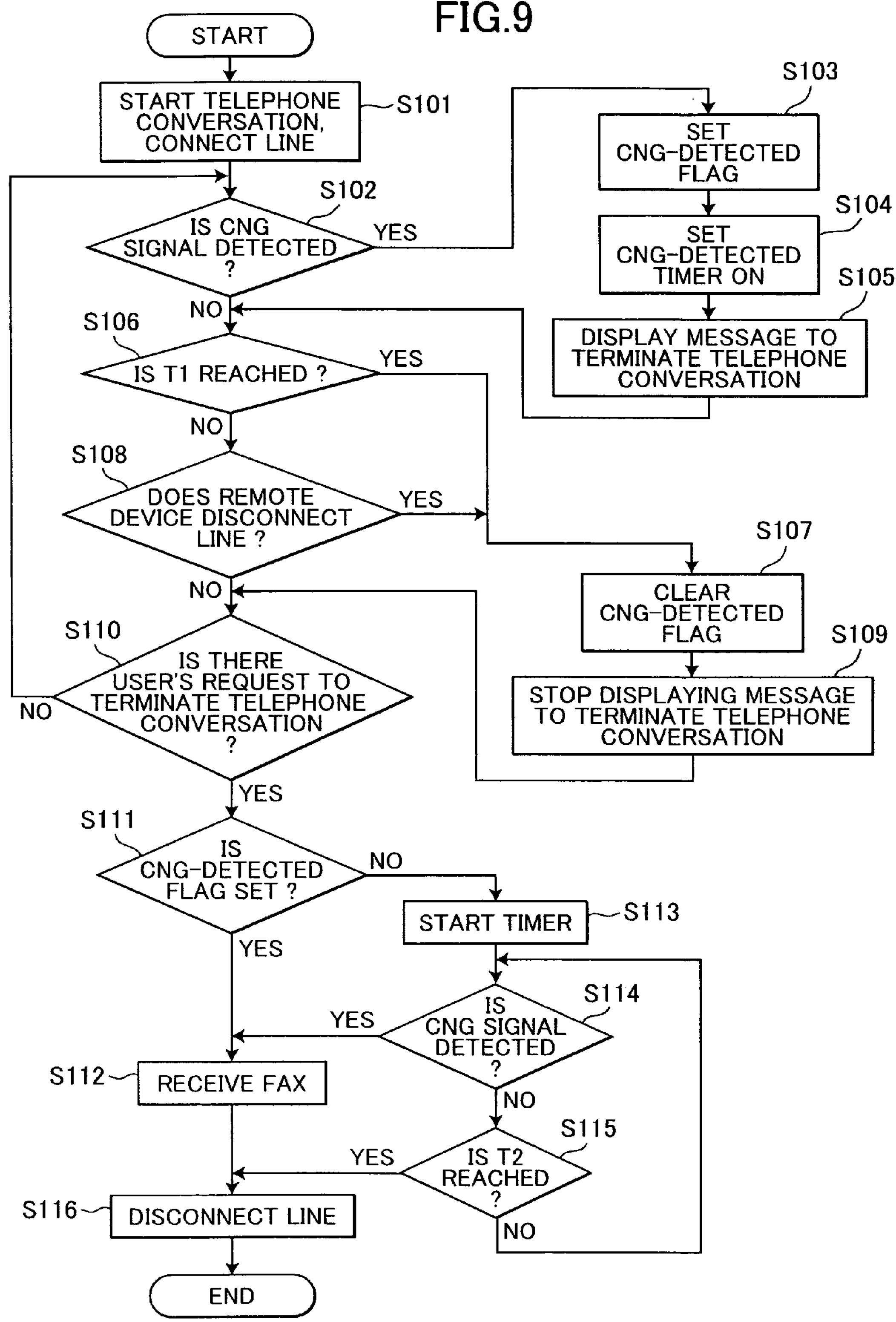
FIG. 9 is a flowchart showing a CNG detection process executed by the main device according to the second embodiment.

According to the present embodiment, the main device 1 executes a CNG signal detection process as shown in FIG. 9.

When the line 30 is connected and telephone conversation is started in S101 between the main device 1 or the cordless handset 31 and a remote device, the CPU 25 judges in S102 whether or not the CNG signal detection unit 28*a* detects a CNG signal. If the CNG signal detection unit 28*a* detects a CNG signal (S102: YES), in S103, a CNG-detected flag is set in the RAM 17 to indicate that a CNG signal has been detected. In S104, the CNG-detected timer 17*a* is activated to start measuring time for the predetermined period T1. Then, in S105, the display 2 on the main device 1 and the display 33 on the cordless handset 31 are controlled to display a message that notifies the user that a facsimile reception will be attained and therefore that the user should terminate the present telephone conversation. Also in S105, the cordless handset 31 is vibrated for a predetermined period of time (three seconds, for example). Then, in S106, it is judged whether or not the CNG-detected timer 17*a* has measured the predetermined time T1.

If the time measured by the CNG-detected timer 17*a* reaches the time T1 (S106: YES), the CNG-detected flag is reset in S107. Then, in S109, the display 2 is controlled to stop displaying the message to urge the user to end telephone communication. In this way, in S107, the CNG-detected flag is cleared from the RAM 17 if the telephone conversation is not terminated within the period T1 after the timer 17*a* has started measuring time.

If the time measured by the CNG-detected timer 17*a* has not yet reached the time T1 (S106: NO), the CPU 25 judges in S108 whether or not the remote device has disconnected the line to end the telephone conversation. It is noted that a busy tone signal is transmitted from an exchange device (not shown in the drawings) to the NCU 23 when the remote device disconnects the line to end telephone conversation. Accordingly, in S108, the CPU 25 judges whether or not the NCU 23 detects arrival of a busy tone signal to know whether or not the remote device disconnects the line to end telephone communication.

If the remote device does not disconnect the line (S108: NO), the CPU 25 further judges in S110 whether or not the user places his/her handset 22 into an on-hook condition or depresses the hook button on his/her cordless handset 31 to indicate his/her desire to end the telephone communication with the remote device. If the user does not place his/her handset 22 or 31 into an on-hook condition (no in S110), the program returns to S102. If the user places his/her handset 22 or 31 into an on-hook condition (yes in S110), the program proceeds to S111.

On the other hand, if the user does not bring his/her handset 22 or 31 into an on-hook condition (no in S110) but if the remote device disconnects the line (S108: YES), the program proceeds to S107, in which the CPU 25 resets the CNG-detected flag. Then, in S109, the display 2 is controlled to stop displaying the message.

In this way, the CPU 25 activates the CNG-detected timer 17*a* in S104 based on the CNG-detected flag, which has been set in the RAM 17 in S103. If the time measured by the CNG-detected timer 17*a* reaches time T1 (S106: YES) but telephone conversation continues, it is known that the user does not intend to receive facsimile. The CPU 25 therefore determines that the CNG detection unit 28*a* has falsely detected noise as the CNG signal in S102 and therefore that there is no need to receive incoming facsimile. Accordingly, the CNG-detected flag is cleared from the RAM 17 in S107.

Also when the remote device disconnects the line within the time period T1 (S108: YES) and the user does not bring the handset 22 or 31 into an on hook condition (NO in S110), it is known that a remote person at the remote device does not intend to transmit facsimile and that the user does not intend to receive facsimile. The CPU 25 also determines that the CNG detection unit 28*a* has falsely detected noise as the CNG signal in S102 and therefore that there is no need to receive incoming facsimile. Accordingly, the CNG-detected flag is cleared from the RAM 17 in S107. In this way, if the user does not terminate the telephone conversation within the certain period T1 or if the remote device disconnects the line within the certain period T1, the CPU 25 assumes that the CNG signal detection unit 28*a* has falsely detected an audio signal (noise) that has a similar signal component to a CNG signal as a CNG signal, and therefore the CPU 25 determines not to perform reception of a facsimile document based on the presently-set CNG-detected flag.

Additionally, according to the present embodiment, when a CNG signal is detected in S102, the display 2 is controlled to show a message that urges the user to end the conversation, and at the same time the cordless handset 31 vibrates for a certain period. These notifications are useful when the user does not know how to receive a facsimile but he/she continues his/her telephone communication even after a CNG signal is detected. Considering this potential problem, when a CNG signal is detected during a conversation, the display 2 is controlled in S105 to show a message such as "Fax will come. Hang up the handset if you wish to start fax reception."

Additionally, if the remote device does not terminate the conversation (S108: NO), it is judged in S110 whether or not the user requests to terminate the telephone conversation by detecting whether or not the user brings the handset 22 or 31 into an on hook condition. If the user indicates no request to end telephone conversation (S110: NO), the CPU 25 determines that there is no need to shift the state of the main device 1 into the facsimile reception mode, and determines not to read the CNG-detected flag from the RAM 17. Then, the program returns to S102.

On the other hand, if the user brings the receiver (handset 22 or cordless handset 31) into an on-hook condition to indicate his/her desire to end the telephone conversation (S110: YES), it is known that the user may possibly desire to bring the facsimile machine 1 into the facsimile reception mode. Accordingly, the program proceeds to S111, in which the CPU 25 judges whether or not a CNG-detected flag has already been set in the RAM 17. If a CNG-detected flag is stored in the RAM 17 (S111: YES), then in S112 the main device 1 starts receiving an incoming facsimile transmitted from the remote device.

On the other hand, if a CNG-detected flag is not set in the RAM 17 (S111:NO), then the CNG-non-detected timer 17*b* is activated in S113 to start measuring the other predetermined period of time T2. Then, in S114, it is judged whether or not the CNG signal detection unit 28*a* detects a CNG signal. If a CNG signal is not yet detected (S114: NO), it is further judged in S115 whether or not the time measured by the CNG-non-detected timer 17*b* reaches the predetermined time T2. If the time T2 is not yet reached (no in S115), the process returns to S114. If a CNG signal is detected (S114: YES) before the time T2 is reached (S115: NO), then an incoming facsimile is received in S112.

There is a possibility that the user places his/her handset 22 or 31 into an on-hook condition before a CNG signal arrives the main device 1. Considering this potential problem, if the user places his/her handset 22 or 31 into an on-hook condition in S110, the main device 1 assumes that the user will possibly desire to receive facsimile. Accordingly, if the CNG signal has not yet been detected when the user places his/her handset 22 or 31 into an on-hook condition in S110, the main device 1 waits for arrival of a CNG signal, and starts facsimile reception if a CNG signal is detected within the time period T2 after the user has ended his/her telephone conversation in S110.

On the other hand, if the CNG signal detection unit 28*a* does not detect a CNG signal (S114: NO) within the time period T2 (S115: YES), then the line is disconnected in S116.

As described above, according to the present embodiment, while the user conducts a telephone communication with the remote device using the main device 1 or the cordless handset 31 by using the telephone function, if the CNG signal detection unit 28*a* detects a CNG signal, the CPU 25 sets a CNG-detected flag in the RAM 17. The CPU 25 then determines whether or not to read the CNG-detected flag from the RAM 17 and to start receiving an incoming facsimile based on the CNG-detected flag. More specifically, the CPU 25 determines to read the CNG-detected flag from the RAM 17 when the user places his/her receiver (handset 22 or cordless handset 31) into an on hook condition, and starts receiving an incoming facsimile based on the CNG-detected flag.

In this way, even when the CNG signal detection unit 28*a* detects a CNG signal while telephone communication is being attained with the remote device, the facsimile device 1 does not proceed to receive a facsimile if the CPU 25 determines not to read the CNG-detected flag from the RAM 17. If a noise that has a similar signal component to a CNG signal is detected falsely as a CNG signal, the CPU 25 determines not to read the CNG-detected flag from the RAM 17, and not to receive facsimile based on the CNG-detected flag. Accordingly, it is possible to prevent the facsimile device from being shifted to a facsimile reception mode upon receipt of a noise.

Modifications of Second Embodiment

Various modifications can be applied to the second embodiment.

For example, in S108, the NCU 23 may detect reversal of polarity of the external line 30 in the case where the polarity of the external line 30 is reversed before a busy tone signal is transmitted from an exchange device. It is also possible to determine whether or not a telephone conversation is terminated by the remote device.

An alarming sound, such as a buzzer sound, may be outputted in S105 by the main device 1 or the cordless handset 31 to urge the user to end the telephone communication. A message sound may be outputted in S105 by the main device 1 or the cordless handset 31 to urge the user to end the telephone communication. For example, the message sound is a message saying "Fax will come. Hang up the handset if you wish to start fax reception."

Figure 10:
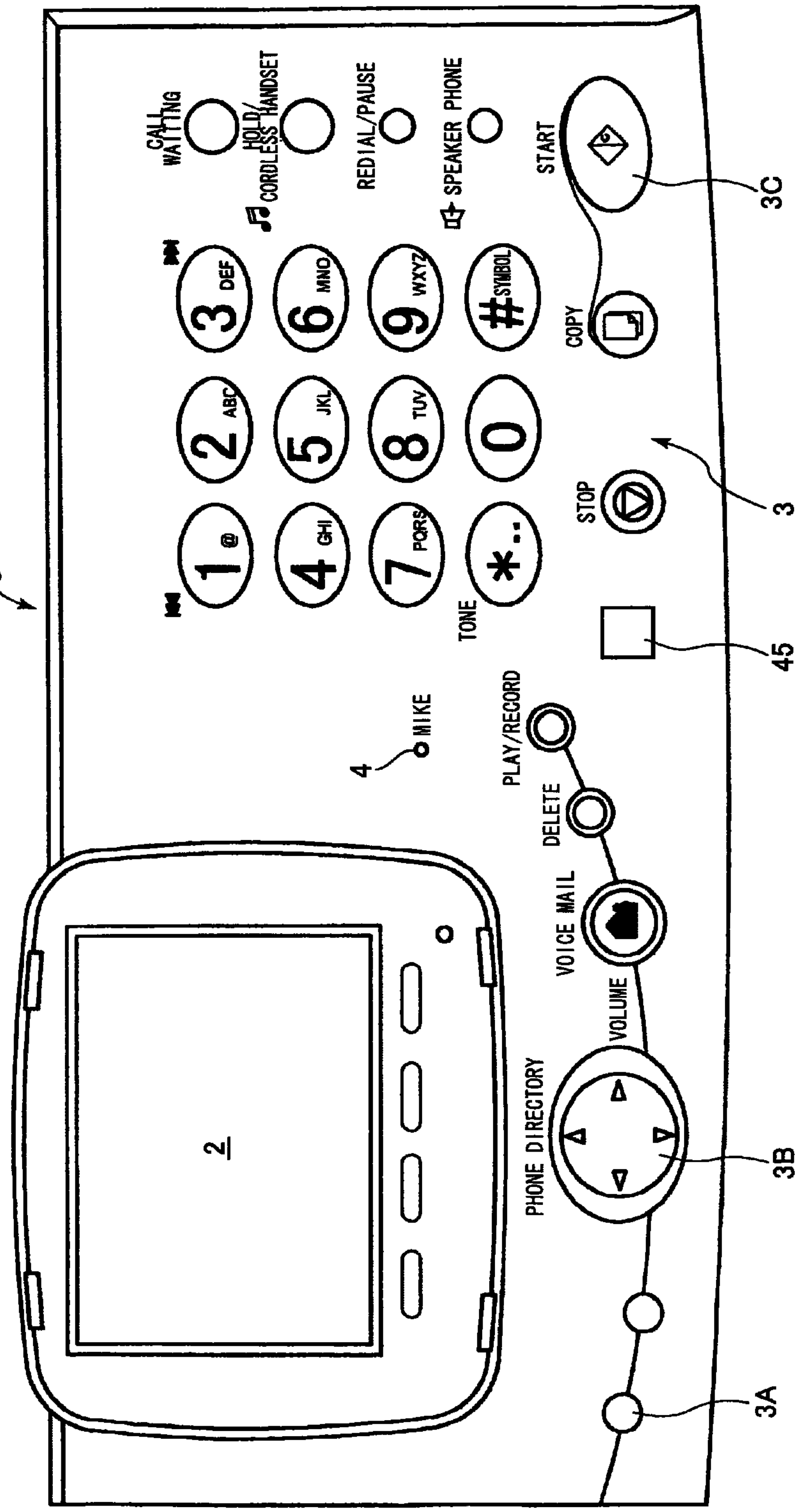
FIG. 10 is a plan view showing an external configuration of the main device according to a modification of the second embodiment.

A manual operation key 45 may be added to the main device 1 as shown in FIG. 10. The manual operation key 45 may be added to the cordless handset 31 although not shown in the drawing. The user inputs his/her desire to terminate telephone conversation by depressing the manual operation key 45. In this case, in S110, the CPU 25 judges whether or not the manual operation key 45 is depressed. When the manual operation key 45 is depressed (yes in S110), the decision is made to read a CNG-detected flag from the RAM 17 and to shift the state of the main device 1 into a state of receiving an incoming facsimile. Instead of manipulating the special button 45, manipulating a predetermined combination of several keys may be used to input the user's desire to terminate telephone conversation.

As described above, according to the present embodiment and modifications, when a CNG signal is detected while telephone conversation is being attained, a CNG-detected flag indicative of the fact that a CNG signal has been detected is stored in the memory 17, but the main device 1 is not automatically shifted into a facsimile reception mode. That is, if the main device 1 determines not to read the CNG-detected flag from the memory 17, the main device 1 is not shifted into a facsimile reception mode. Accordingly, it is possible to prevent the main device 1 from being erroneously shifted to the facsimile reception mode when a noise that has a similar signal component to the CNG signal is falsely detected as a CNG signal.

Only when the receiver (handset 22 or cordless handset 31) is brought into an on-hook condition or when a special key-combination or a special button 45 is depressed, the main device 1 determines to read the CNG-detected flag from the memory 17 because the user desires to terminate his/her telephone conversation with the remote device. If the CNG-detected flag is actually stored in the memory 17 at this stage, the main device 1 is shifted into a facsimile reception mode. It is noted that there may be the case where the CNG-detected flag is stored due to false detection of a noise and thereafter the main device 1 is shifted to the facsimile reception mode by the user's on-hook operation of the handset or the special button 45. However, in such a case, the user and the remote person will not suffer because they have already ended their telephone conversation.

In this way, the main device 1 is automatically shifted to a facsimile reception mode when the user inputs his/her instruction to terminate the telephone communication by placing the receiver 22 or 31 into an on hook condition or depressing the special key 45 or the like. This satisfies the user who has ended their conversation in order to receive facsimile.

Especially, according to the present embodiment, the CNG-detected timer 17*a* measures the time T1 upon setting of the CNG-detected flag. If the remote device disconnects the line before the time T1 is reached, the CNG-detected flag is deleted. Accordingly, when the remote person does not intend to send facsimile to the present main device 1 but the main device 1 falsely detects noise as a CNG signal, it is possible to prevent the main device 1 from being erroneously shifted to the facsimile reception mode.

Similarly, if the user does not end the telephone communication before the time T1 is reached, the CNG-detected flag is deleted. Accordingly, when the user does not intend to receive facsimile but the main device 1 falsely detects noise as a CNG signal, it is possible to prevent the main device 1 from being erroneously shifted to the facsimile reception mode.

If no CNG-detected flag is stored in the memory 17 when the user ends his/her telephone conversation with the remote device and brings the handset (22 or 31) into an on-hook condition, the timer 17*b* is activated and arrival of a CNG signal is waited for the predetermined time T2. If a CNG signal arrives within the time T2, facsimile reception operation is executed. Even if no CNG-detected flag is stored in the memory at the time when the user ends his/her telephone conversation and places the handset (22 or 31) into an on-hook condition, it is ensured that the main device 1 can perform a facsimile reception by waiting for arrival of a CNG signal for the predetermined time T2 after the user places the handset (22 or 31) into an on-hook condition.

Third Embodiment

Next, a communication device according to a third embodiment of the present invention will be described with reference to FIGS. 11 through 17.

Figure 11:
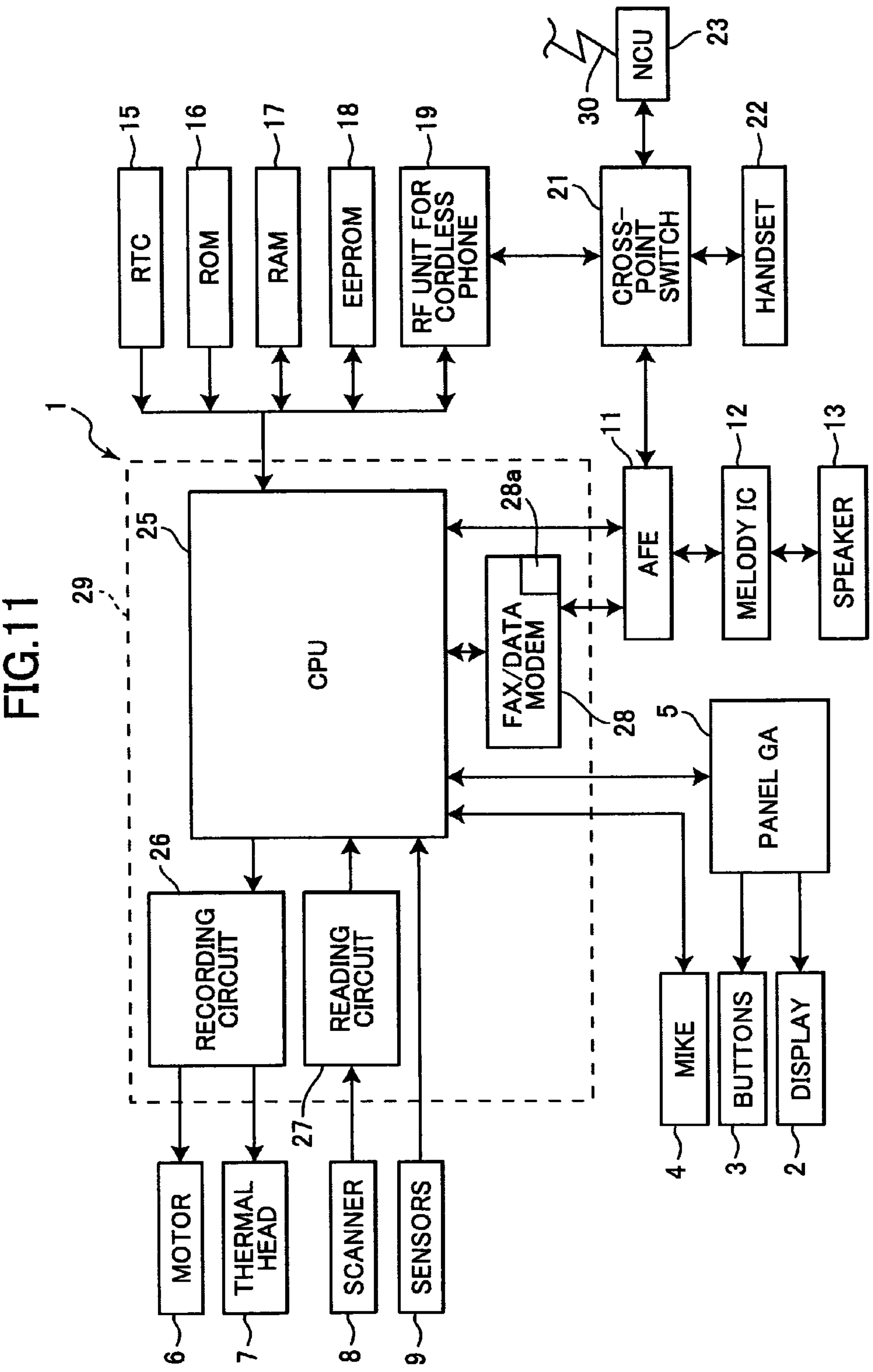
FIG. 11 is a block diagram showing an electrical configuration of the main device according to a third embodiment.

The main device 1 and the cordless handset 31 of the third embodiment are the same as those of the first and second embodiments except for the points described below:

According to the first embodiment, the RAM 17 on the main device 1 is provided with the counters 17A, 17B, the timer 17C, and the memory portion 17D. According to the second embodiment, the RAM 17 is provided with the CNG-detected timer 17*a*, and the CNG-non-detected timer 17*b*. However, according to the present embodiment, as shown in FIG. 11, the RAM 17 is not provided with such configurations.

Figure 12:
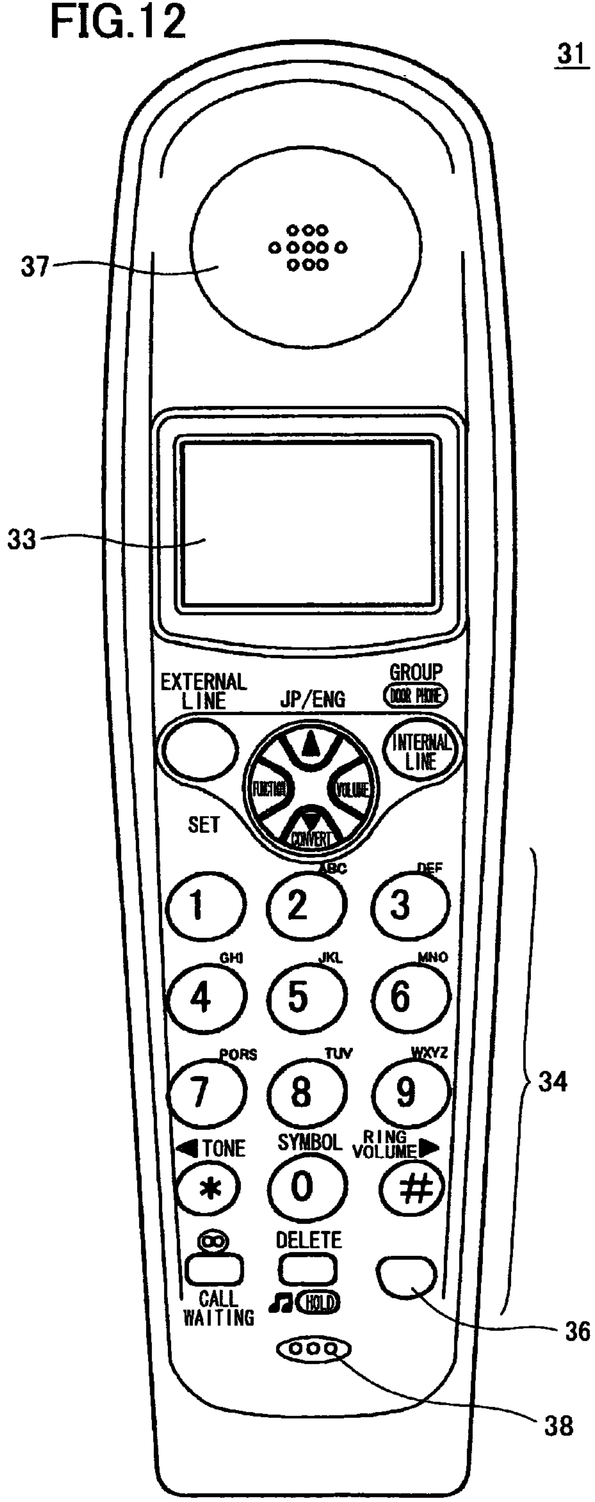
FIG. 12 is a plan view showing an external configuration of the subsidiary device (cordless handset) according to the third embodiment.

Additionally, according to the present embodiment, as shown in FIG. 12, the cordless handset 31 further has a manual operation key 36. When the user depresses the manual operation key 36, the microphone 38 is muted and the user's voice is not inputted to the cordless handset 31.

Figure 13:
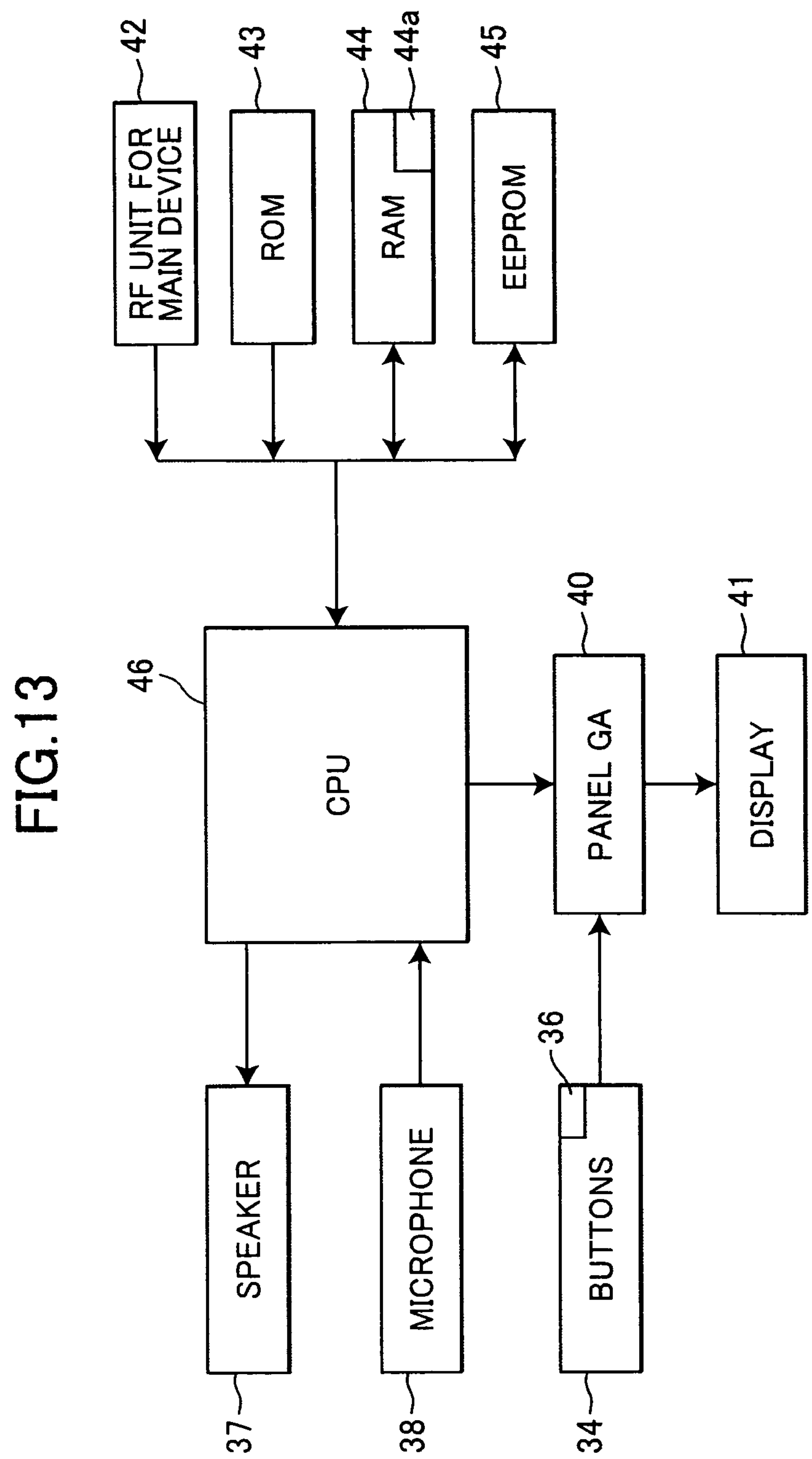
FIG. 13 is a block diagram showing an electrical configuration of the subsidiary device of FIG. 12.

According to the present embodiment, as shown in FIG. 13, the RAM 44 is controlled by the CPU 46 to serve as a mute timer 44*a*. The mute timer 44*a* is for measuring a predetermined period of mute time TM (four seconds, for example). The mute timer 44*a* starts measuring time when the user depresses the manual operation key 36.

In order to execute telephone communication between the remote device and the cordless handset 31 via the main device 1 and the external telephone line 30, wireless communication is established between the cordless handset 31 and the main device 1. If the user depresses the manual operation key 36 while telephone communication is being executed between the remote device and the cordless handset 31, the CPU 46 mutes the microphone 38 for the predetermined time TM while activating the mute timer 44*a* to measure the mute time TM. During the mute time TM after operation of the manual operation key 36, the user's voice is not inputted to the microphone 38. Accordingly, the user's voice will not be transmitted from the cordless handset 31 to the main device 1 via the wireless line. The CNG signal detection unit 28*a* on the main device 1 can detect a CNG signal without suffering from the user's voice (noise) that will be transmitted to the main device 1 if the manual operation key 36 were not operated.

When the mute time TM has elapsed after the manual operation key 36 has been operated, the CPU 46 controls the microphone 38 back into its normal state where the user's voice can be inputted into the microphone 38. Accordingly, the user's voice will be transmitted again from the cordless handset 31 to the main device 1. In this way, the telephone communication is properly resumed after the time TM (four seconds), which is too short to affect the human's conversation, but which is sufficiently long to detect a CNG signal.

Figure 14:
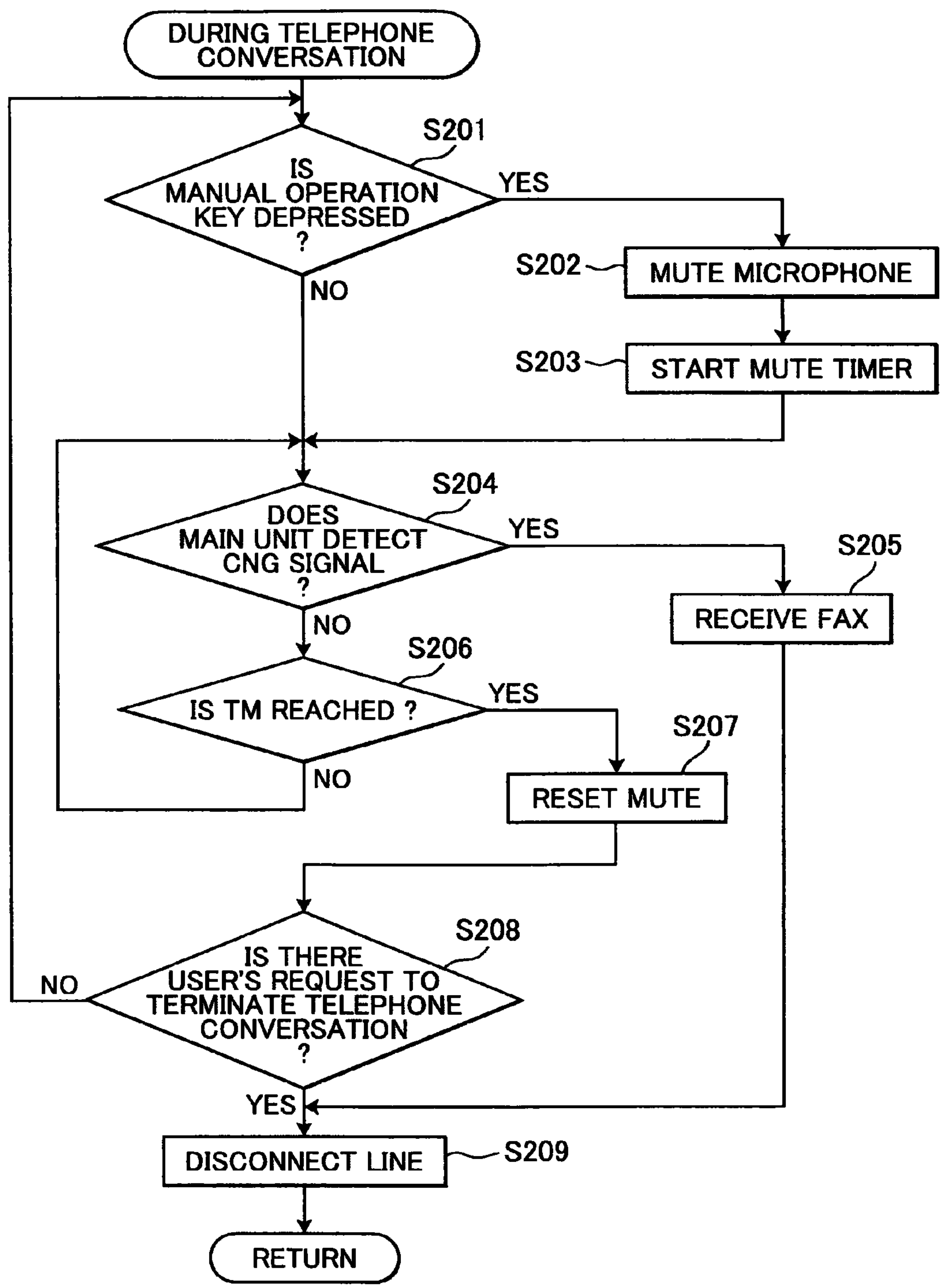
FIG. 14 is a flowchart showing a CNG detection process executed while a telephone conversation is executed by using the cordless handset according to the third embodiment.

According to the present embodiment, while a telephone conversation is being executed between a remote device (not shown) and the cordless handset 31, a CNG signal is detected as shown in FIG. 14.

The CPU 46 in the cordless handset 31 first judges in S201 whether or not the manual operation key 36 is operated while a telephone conversation is being executed by the cordless handset 31. If the manual operation key 36 is depressed (S201: YES), the CPU 46 mutes the microphone 38 in S202, and the mute timer 44*a* is activated to start measuring time in S203. Accordingly, for the mute time TM (four seconds) after operation of the manual operation key 36, no audio signal will be inputted via the microphone 38 and therefore no audio signal will be transmitted from the cordless handset 31 to the main device 1. Accordingly, it is possible to prevent any noise, which is included in an audio signal and which has a similar signal component to a CNG signal, from being transmitted to the main device 1. It is possible to prevent the noise from being falsely detected as a CNG signal by the main device 1.

Because the microphone 38 is muted during such a short period of time TM, the conversation between the remote device and the cordless handset 31 is disabled only for the short period of time TM. After the time TM has elapsed after manipulation of the manual operation key 36, the user and the remote device can resume their conversation.

Next, the CPU 25 on the main device 1 judges in S204 whether or not a CNG signal is detected. If a CNG signal is detected (S204: YES), the CPU 25 receives an incoming facsimile from the remote device in S205. When completing receiving the entire facsimile data, the line is disconnected in S209, and this flow ends. On the other hand, if a CNG signal is not detected (S204: NO), the CPU 46 on the cordless handset 31 judges in S206 whether or not the time measured by the mute timer 44*a* reaches the predetermined mute time TM. If the mute time TM is not yet reached (S206: NO), the program returns to S204, in which the CPU 25 on the main device 1 again judges whether a CNG signal is detected. In this way, the CPU 25 waits for arrival of a CNG signal for the mute time TM. If the mute time TM is reached while no CNG signal arrives (S204: NO, S206: YES), the mute setting is reset in S207, and the audio transmission via the microphone 38 is restarted.

Accordingly, if the user accidentally presses the manual operation key 36, the telephone conversation is disabled temporarily for the mute time TM, but the user will be able to resume the conversation with the remote device after the mute time TM has passed after the manual operation key 36 is operated.

After the mute setting is turned off in S207, the CPU 25 on the main unit 1 checks in S208 the hook condition of the cordless handset 31 to judge whether or not the hook button of the cordless handset 31 is being ON. If the cordless handset 31 is not in an on-hook condition but in an off-hook condition (no in S208), it is known that the user desires to continue telephone conversation, and therefore the program returns to S201.

In this way, if no CNG signal is detected during the mute time TM, the muting of the microphone 38 is reset in S207. If the user does not desire to end his/her conversation with the remote device (no in S208), the conversation with the remote device via the public telephone line 30 is resumed.

On the other hand, if the cordless handset 31 is in an on-hook condition (yes in S208), it is known that the user wants to end the telephone conversation, and therefore, the CPU 25 disconnects the line in S209, and this flow ends.

In this way, if a CNG signal does not arrive within the mute time TM after manipulation of the manual operation key 36, the CPU 25 detects the hook condition of the cordless handset 31, and terminates the telephone conversation with the remote device if the cordless handset 31 is in an on-hook condition.

If the user erroneously manipulates the manual operation key 36, the user will not press the hook button of the cordless handset 31. Accordingly, the judgment in S208 will become negative, and the telephone conversation will be resumed.

Contrarily, if the user intentionally manipulates the manual operation key 36 in order to receive incoming facsimile, the user will depress the hook button of the cordless handset 31 after depressing the manual operation key 36. When a CNG signal arrives, the facsimile reception is executed. When the facsimile reception ends, the line is disconnected. Even when no CNG signal arrives, the line is disconnected by detecting the on-hook condition of the cordless handset 31 (yes in S208). Accordingly, the user does not need to depress the hook button again in order to disconnect the line.

It is noted that according to the present embodiment, the processes of S201-S203 and S206 and S207 are executed by the CPU 46 on the cordless handset 31 side, and the other remaining processes of S204-S205, S208, and S209 are executed by the CPU 25 on the main device 1 side.

As described above in detail, according to the present embodiment, by depressing the manual operation key 36, it is possible to allow the CNG detection unit 28*a* to detect a CNG signal without being influenced by any noise that will be transmitted from the cordless handset 31 if the key 36 were not depressed. Any noise input via the microphone 38 is prevented from being transmitted to the main device 1 after the user presses the manual operation key 36. This enables the facsimile device 1 to detect an arrival of a CNG signal correctly without detecting a noise that has a similar signal component to a CNG signal. Thus, the CNG signal detection unit 28*a* does not falsely detect, as a CNG signal, a noise that is included in an audio signal transmitted from the cordless handset 31 and that has a similar signal component to a CNG signal. This improves accuracy of detecting a CNG signal.

First Modification of Third Embodiment

Next, a first modification of the third embodiment will be described.

Figure 15:
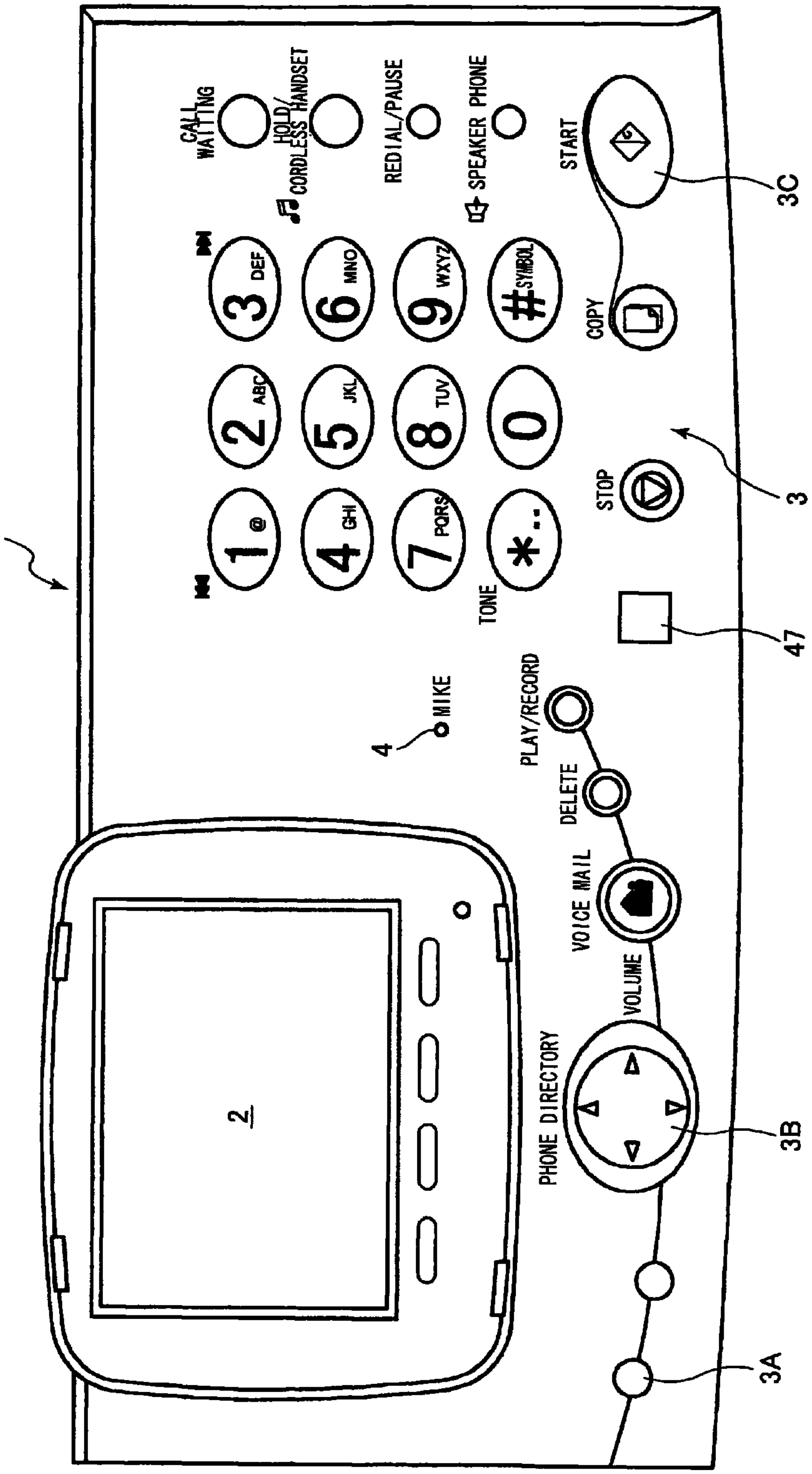
FIG. 15 is a plan view showing an external configuration of the main device according to a first modification of the third embodiment.

According to this modification, as shown in FIG. 15, a manual operation key 47 is additionally provided on the main device 1. When the user depresses the manual operation key 47, the microphone 4 is muted and the user's voice is not inputted to the main device 1. Although not shown in the drawing, the RAM 17 is controlled by the CPU 25 to serve as a mute timer for measuring the predetermined mute time TM. The mute timer starts measuring time when the user depresses the manual operation key 47. If the user depresses the manual operation key 47 while telephone communication is being executed between the remote device and the main device 1 by using the handset 22, the CPU 25 mutes the microphone 4 for the predetermined time TM while activating the mute timer to measure the mute time TM. For the mute time TM after operation of the manual operation key 47, the user's voice is not inputted to the microphone 4. Accordingly, the user's voice will not be inputted into the main device 1. The CNG signal detection unit 28*a* can detect a CNG signal without suffering from the user's voice (noise) that will be inputted into the main device 1 if the manual operation key 47 were not operated. When the mute time TM has elapsed after the manual operation key 47 has been operated, the CPU controls the microphone 4 back into its normal state where the user's voice can be inputted into the microphone 4. Accordingly, the user's voice will be inputted again into the main device 1. The telephone communication is properly resumed after the time TM (four seconds), which is too short to affect the human's conversation, but which is sufficiently long to detect a CNG signal.

The CNG detection process executed according to the present modification is the same as that of FIG. 14 except for the points described below: That is, according to the present modification, all the processes of S201-S209 are executed by the CPU 25 on the main-device side. In S201, it is judged whether or not the manual operation key 47 is depressed. In S202, the CPU 25 mutes the microphone 4. In S203, the CPU 25 activates the RAM 17 as a mute timer. In S208, the CPU 25 checks the hook condition of the handset 22 to judge whether or not the handset 22 is in an on-hook condition. When the handset 22 is in an on-hook, the judgment in S209 is made affirmative.

As described above, according to the third embodiment and its first modification, if the manual operation key 36 or 47 is manipulated while telephone conversation is attained, the main device 1 is brought into a state that can detect a CNG signal while suffering from almost no noise. It is possible to prevent the main device 1 from erroneously detecting a noise that has a similar signal component to the CNG signal as a CNG signal. It is possible to prevent the main device 1 from being erroneously shifted to the facsimile reception mode due to a false detection of the noise. When the user desires to receive facsimile, the user can control the main device 1 to detect a CNG signal by simply manipulating the key 36 or 47. It is ensured that the main device 1 will be shifted to the facsimile reception mode.

The audio signal, inputted into the microphone 4 on the main device 1 and the microphone 38 on the cordless handset 31, has sometimes a signal component similar to the CNG signal. Accordingly, by muting the microphone 4 or 38 to shut off the audio signal, it is possible to prevent the main device 1 from erroneously detecting the audio signal as a CNG signal.

In order to bring the main device 1 into a condition that can detect a CNG signal while suffering from almost no noise, the microphone 4 or 38 is muted in the above description. However, other various methods can be employed to shut up almost all the noises.

Especially, when a CNG signal arrives within the predetermined time TM after the key 36 or 47 is depressed, the main device 1 can receive facsimile. On the other hand, if no CNG signal arrives within the predetermined time TM after the key 36 or 47 is depressed, the mute of the microphone 4 or 38 is reset, and therefore the user can resume his/her telephone conversation with the remote device. Accordingly, even when the user erroneously depresses the key 36 or 47, the user may not perform conversation for a short period of time, but can resume conversation thereafter.

Similarly, when no CNG signal arrives within the predetermined time TM after the key 36 or 47 is depressed but if the user desires to end his/her telephone conversation, the line is automatically disconnected. This satisfies the user's intention.

Second Modification of Third Embodiment

In the above description, the CNG detection unit 28*a* continues detecting CNG signals even while telephone communication is being attained between the main device 1 or the cordless handset 31 and the remote device.

However, according to the present modification, the CNG detection unit 28*a* is set into a CNG-non-detection mode while telephone communication is being attained between the cordless handset 31 and the remote device. In the CNG-non-detection mode, the CNG detection unit 28*a* is disabled to detect CNG signals. Accordingly, the CNG detection unit 28*a* may not detect CNG signals while telephone communication is being attained between the cordless handset 31 and the remote device. The CNG detection unit 28*a* is brought into a CNG detection mode only when a CNG detection command is transmitted from the cordless handset 31 to the main device 1.

It is noted that the CNG signal detection command is sent from the cordless handset 31 to the main device 1 when the user depresses the manual operation key 36 while a telephone conversation is being executed with the remote device using the cordless handset 31. As a result, the CNG signal detection unit 28*a* is brought into the CNG detection mode, in which the CNG signal detection unit 28*a* can detect a CNG signal. The CNG signal detection unit 28*a* is in the CNG detection mode only for a predetermined detection period TD. Accordingly, the CNG signal detection unit 28*a* can detect a CNG signal only for the detection time TM after the manual operation key 36 is operated.

In this way, according to this modification, when the manual operation key 36 is pressed, the cordless handset 31 sends a command for controlling the main device 1 to start detecting a CNG signal, instead of muting the microphone 38.

Figure 16A:
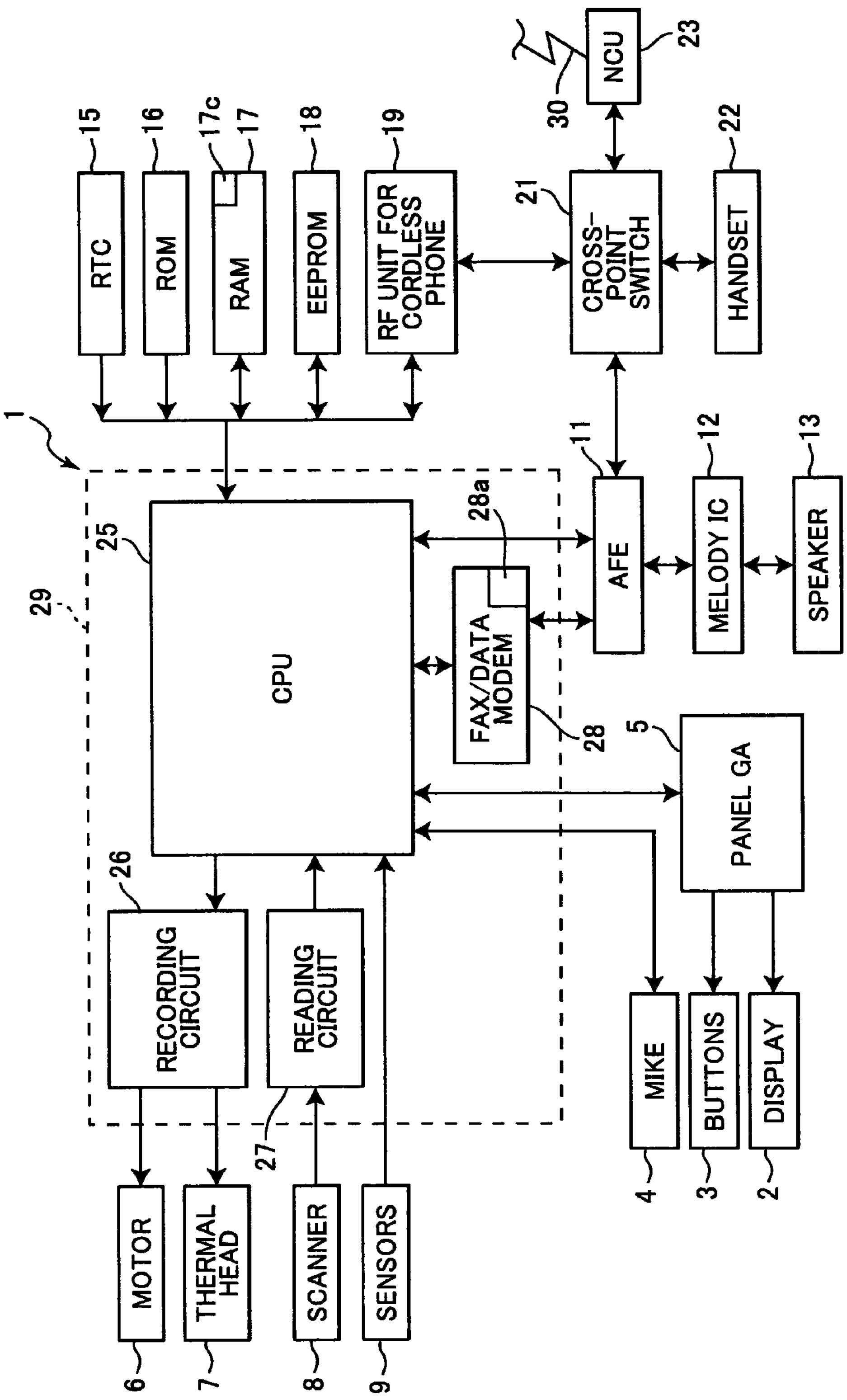
FIG. 16A is a block diagram showing an electrical configuration of the main device according to a second modification of the third embodiment.
Figure 16B:
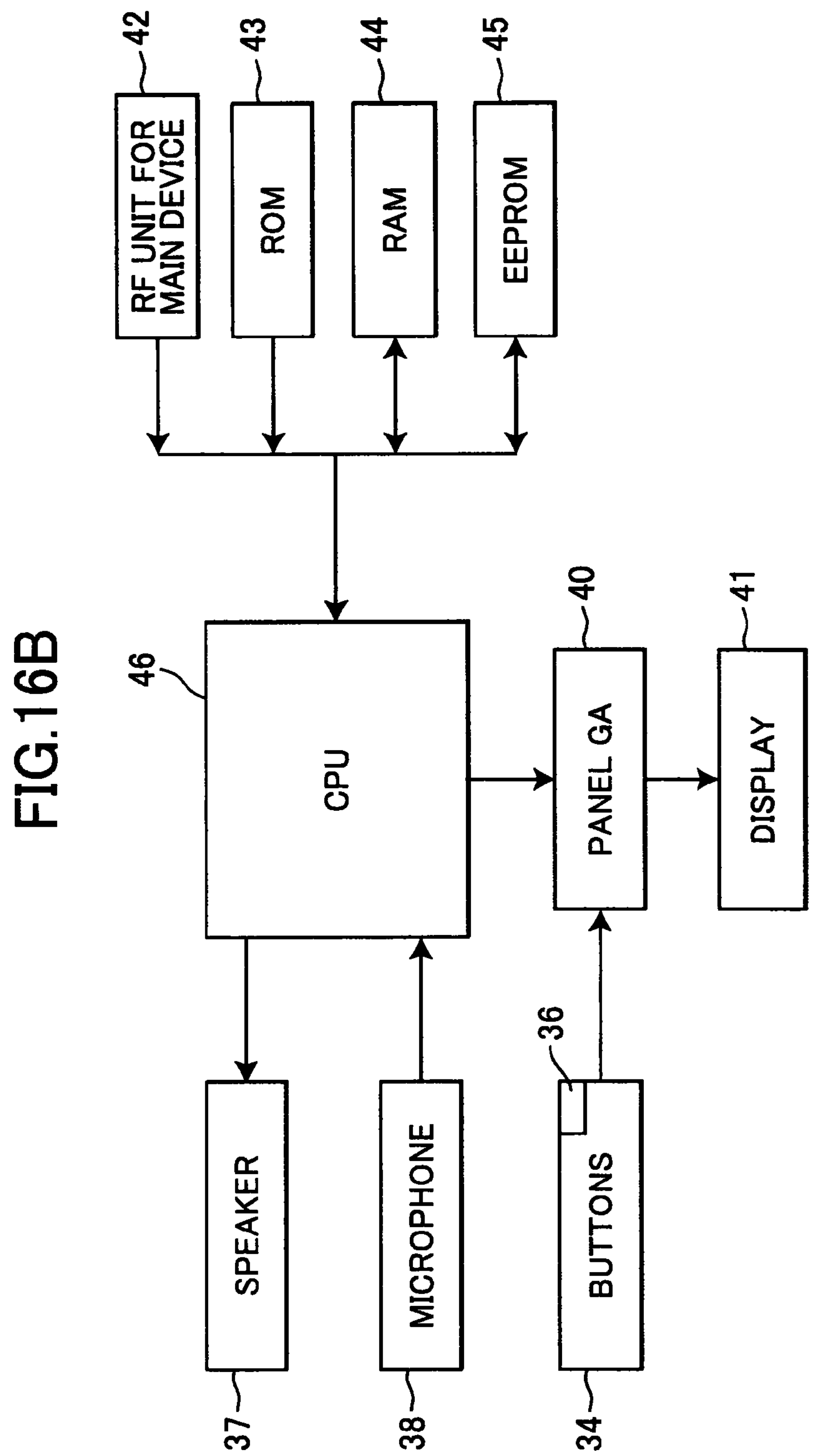
FIG. 16B is a block diagram showing an electrical configuration of the subsidiary device according to the second modification of the third embodiment.

The present modification is the same as the third embodiment except that the RAM 17 serves as a detection timer 17*c* as shown in FIG. 16A and that the RAM 44 does not serve as the mute timer 44*a* as shown in FIG. 16B.

Figure 17:
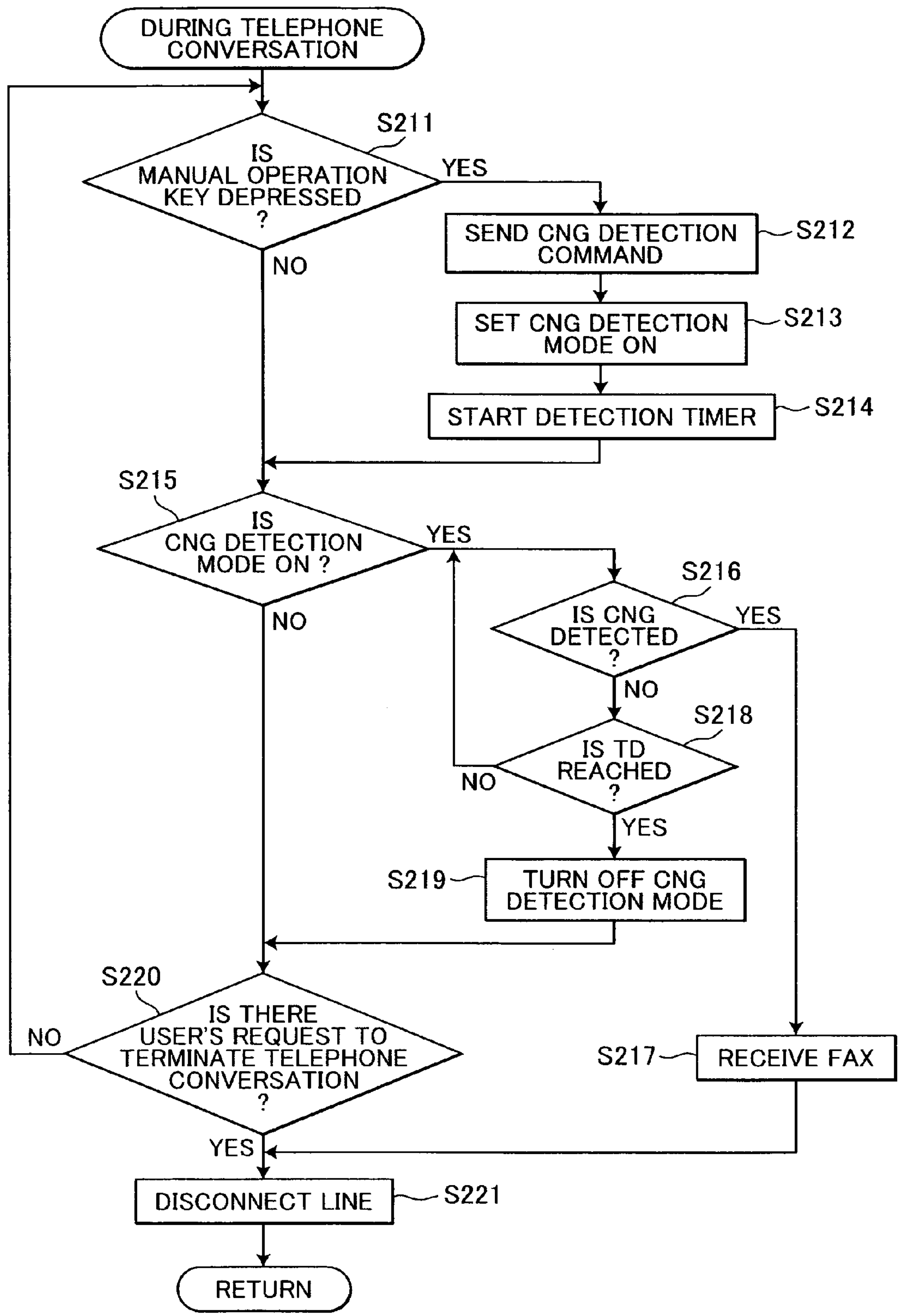
FIG. 17 is a flowchart showing a CNG detection process executed while a telephone conversation is executed by using the cordless handset according to the second modification of the third embodiment.

As shown in FIG. 17, the CPU 46 in the cordless handset 31 first judges in S211 whether or not the manual operation key 36 is operated while telephone communication is being executed between the cordless handset 31 and the remote device via the main device 1. If the manual operation key 36 is depressed during the conversation (S211: YES), the CPU 46 sends in S212 a CNG detection command from the cordless handset 31 to the main device 1. As a result, in the main device 1, the CPU 25 sets the CNG signal detection mode to ON in S213, and starts the detection timer 17*c* to measure time in S214. As a result, the CNG signal detection unit 28*a* in the main device 1 is brought into the CNG detection mode from the CNG-non-detection mode. The CNG signal detection unit 28*a* continues in the CNG detection mode only for the predetermined detection time TD (four seconds, for example). Accordingly, the CNG signal detection unit 28*a* may detect CNG signals only for the predetermined time TD after the manual operation key 36 is depressed. Thus, it is possible to reduce the possibility that the CNG signal detection unit 28*a* falsely detects noises as CNG signals because the CNG signal detection unit 28*a* is normally set in the CNG-non-detection mode while telephone communication is being established between the cordless handset 31 and the remote device.

Next in S215, the CPU 25 judges whether or not the CNG detection mode is ON. If the CPU 25 determines that the CNG detection mode is ON (S215: YES), the CPU 25 judges in S216 whether or not a CNG signal is detected by the CNG detection unit 28*a*. If a CNG signal is detected (S216: YES), the CPU 25 receives an incoming facsimile from the remote device in S217. On the other hand, if a CNG signal is not detected (S216: NO), the CPU 25 judges in S218 whether or not the time measured by the detection timer 17*c* reaches the detection time TD. If the detection time TD is not yet reached (S218: NO), the program returns to S216. On the other hand, if the detection time TD is reached (S218: YES), the CNG detection mode is turned OFF in S219. As a result, the CNG detection unit 28*a* is brought back into the CNG-non-detection mode.

Next, in S220, the CPU 25 checks the hook condition of the cordless handset 31 to know whether the user desires to terminate the telephone conversation. If the cordless handset 31 is not in an on-hook condition (S220: NO), the program returns to S211. On the other hand, if the cordless handset 31 is in an on-hook condition (S220: YES), then, in S221, the CPU 25 disconnects the line, and this flow ends.

In this way, the processes of S211-S212 are executed by the CPU 46 on the cordless handset 31 side, and the processes of S213-S221 are executed by the CPU 25 on the main device 1 side.

As described above in detail, according to the present modification, the CPU 46 sends a command from the cordless handset 31 to the main device 1 based on an operation of the manual operation key 36. The command is for activating the CNG signal detection unit 28*a* in the main device 1 to detect an arrival of a CNG signal. Thus, the main device 1 will receive a facsimile if a CNG signal arrives within the certain period TD after the manual operation key 36 is pressed.

Thus, the cordless handset 31 sends a command, for enabling detection of a CNG signal, to the main device 1 under control of the CPU 46 when the manual operation key 36 is pressed on the cordless handset 31 during a telephone conversation. The CNG signal detection unit 28*a* does not detect a CNG signal normally during telephone conversation, but detects a CNG signal only for the certain period TD after the manual operation key 36 is pressed. Thus, the CNG signal detection unit 28*a* normally does not falsely detect a noise as a CNG signal. This improves accuracy of detecting a CNG signal.

If the user erroneously manipulates the manual operation key 36, the user will not press the hook button of the cordless handset 31. Accordingly, the judgment in S220 will become negative, and the telephone conversation will be resumed.

Contrarily, if the user intentionally manipulates the manual operation key 36 to receive incoming facsimile, the user will depress the hook button of the cordless handset 31 after depressing the manual operation key 36. When a CNG signal arrives, the facsimile reception is executed. When the facsimile reception ends, the line is disconnected. Even when no CNG signal arrives, the line is disconnected by detecting the on-hook condition of the cordless handset 31 (yes in S220). Accordingly, the user does not need to depress the hook button again in order to disconnect the line.

In the above description, the CNG detection unit 28*a* is set into a CNG-non-detection mode while telephone communication is being attained between the cordless handset 31 and the remote device. However, the CNG detection unit 28*a* may always be set into a CNG-non-detection mode regardless of whether or not telephone communication is being executed. The CNG detection unit 28*a* may be set into a CNG detection mode only when the CNG detection command is transmitted from the cordless handset 31.

It is noted that in S212, the cordless handset 31 may mute the microphone 38 as well as send the CNG detection command to the main device 1. In this case, the cordless handset 31 continues muting the microphone 38 during the time TD, and resets muting of the microphone 38 in S219 as well as turns off the CNG detection mode.

Third Modification of Third Embodiment

In the same manner as in the first modification, the second modification can be modified by providing the manual operation key 47 on the main device 1 as shown in FIG. 15. According to this modification, when the manual operation key 47 is pressed, the CNG signal detection unit 28*a* is brought into the CNG detection mode from the CNG-non-detection mode.

More specifically, according to the present modification, the CNG detection unit 28*a* is set into a CNG-non-detection mode while telephone communication is being attained between the main device 1 by using the handset 22 and the remote device. In the CNG-non-detection mode, the CNG detection unit 28*a* is disabled to detect CNG signals. Accordingly, the CNG detection unit 28*a* may not detect CNG signals while telephone communication is being attained between the main device 1 and the remote device. The CNG detection unit 28*a* is brought into the CNG detection mode only when a CNG detection command is issued in response to the depression of the manual operation key 47.

It is noted that the CPU 25 issues the CNG signal detection command when the user depresses the manual operation key 47 while a telephone conversation is being executed with the remote device using the main device 1. As a result, the CNG signal detection unit 28*a* is brought into the CNG detection mode, in which the CNG signal detection unit 28*a* can detect a CNG signal. The CNG signal detection unit 28*a* is in the CNG detection mode only for the predetermined detection period TD. Accordingly, the CNG signal detection unit 28*a* can detect a CNG signal for the detection time TM after the manual operation key 47 is operated.

In this way, according to this modification, when the manual operation key 47 is pressed, the CPU 25 issues a command for controlling the CNG detection unit 28*a* to start detecting a CNG signal, instead of muting the microphone 4. It is noted, however, that the CPU 25 may mute the microphone 4 as well as issue the CNG detection command to bring the CNG detection unit 28*a* to start detecting a CNG signal. It is possible to detect an arrival of a CNG signal while shutting out noises.

The CNG detection process according to the present modification is the same as that of FIG. 17 except for the points described below: That is, according to the present modification, all the processes of S211 to S221 are executed by the CPU 25 on the main-device 1 side. In S211, it is judged whether or not the manual operation key 47 is depressed. In S212, the CPU 25 issues a CNG detection command. In S220, the CPU 25 checks the hook condition of the handset 22 to judge whether or not the handset 22 is in an on-hook condition. When the handset 22 is in an on-hook, the judgment in S220 is made affirmative.

It is noted that in S212, the main device 1 may mute the microphone 4 as well as issue the CNG detection command. In this case, the main device 1 continues muting the microphone 4 during the time TD, and resets muting of the microphone 4 in S219 as well as turns off the CNG detection mode.

In the above description, the CNG detection unit 28*a* is set into a CNG-non-detection mode while telephone communication is being attained between the main device 1 and the remote device. However, the CNG detection unit 28*a* may always be set into a CNG-non-detection mode regardless of whether or not telephone communication is being executed. The CNG detection unit 28*a* may be set into a CNG detection mode only when the CNG detection command is issued upon depression of the manual operation key 47.

As described above, according to the second and third modifications, when the key 36 or 47 is depressed, the CNG signal detection unit 28*a* is activated to detect arrival of a CNG signal while a telephone communication is being executed. On the other hand, if the key 36 or 47 is not depressed during telephone communication, the CNG signal detection unit 28*a* is not activated to detect arrival of a CNG signal. It is possible to prevent the CNG signal detection unit 28*a* from erroneously detecting noise that has a similar component to a CNG signal. It is possible to prevent the main device 1 from erroneously being shifted to a facsimile reception mode due to false detection of noise.

While the invention has been described in detail with reference to the specific embodiments thereof, it would be apparent to those skilled in the art that various changes and modifications may be made therein without departing from the spirit of the invention.

What is claimed is:

1. A communication device, comprising:

a facsimile receiving portion that detects a facsimile activation signal that is transmitted from a remote device via an external communication line while a telephone conversation is being executed with the remote device, and that switches from telephone function into facsimile function to execute facsimile receiving operation; and an error preventing portion that prevents the facsimile receiving portion from erroneously executing the facsimile receiving operation based on noise;

wherein the facsimile receiving portion includes:

a facsimile activation signal detecting portion that detects the facsimile activation signal;

a communicating portion that communicates with the remote device; and a receipt-controlling portion that enables the communicating portion into a state, in which the communicating portion is capable of receiving facsimile when the facsimile activation signal detecting portion detects the facsimile activation signal, and wherein the error preventing portion includes:

an instruction input portion that receives a near end user's instruction, while telephone communication is being executed with the remote device, the near end user's instruction being for bringing the facsimile activation signal detecting portion into a state, in which the facsimile activation signal detecting portion is capable of detecting the facsimile activation signal without being influenced by noise while telephone communication is being executed with the remote device; and a noise-input preventing portion that prevents the near end user's voice from being inputted in response to input of the near end user's instruction, thereby enabling the facsimile activation signal detection portion to detect the facsimile activation signal without being influenced by the near end user's voice while telephone communication is being executed with the remote device.

2. A communication device as claimed in claim 1, wherein the facsimile activation signal detecting portion is in a detection mode, in which the facsimile activation signal detecting portion is capable of detecting the facsimile activation signal while telephone communication is being attained with the remote device.

3. A communication device as claimed in claim 1, further including a microphone receiving the user's voice while the user executes telephone communication with the remote device, and wherein the noise-input preventing portion prevents the microphone from receiving the user's voice in response to input of the user's instruction.

4. A communication device as claimed in claim 1, further comprising:

a main device that is connectable to the external communication line and that has the facsimile reception function and the telephone function; and a subsidiary device that is wirelessly connectable with the main device and that has the telephone function, wherein the main device includes: the facsimile activation signal detecting portion, the communicating portion, and the receipt-controlling portion.

5. A communication device as claimed in claim 4, wherein the subsidiary device includes the instruction input portion and the noise-input preventing portion, wherein the instruction input portion includes a first manual operation member that the user manually operates to input his/her instruction not to transmit his/her voice from the subsidiary device to the main device while he/she is executing telephone communication with the remote device by using the subsidiary device and via the main device and the external communication line, and wherein the noise-input preventing portion includes a noise-transmission preventing portion that prevents the user's voice from being transmitted from the subsidiary device to the main device when the first manual operation member is operated by the user.

6. A communication device as claimed in claim 5, wherein the subsidiary device further includes a microphone for receiving the user's voice while the user executes telephone communication with the remote device, and wherein the noise-transmission preventing portion prevents the microphone from receiving the user's voice in response to the user's manual operation of the first manual operation member.

7. A communication device as claimed in claim 4, wherein the main device includes the instruction input portion and the noise-input preventing portion, wherein the instruction input portion includes a second manual operation member that the user manually operates to input his/her instruction to prevent noise from being inputted to the main device while he/she is executing telephone communication by using the main device via the external communication line, and wherein the noise-input preventing portion prevents the user's voice from being inputted into the main device in response to the user's manual operation of the second manual operation member.

8. A communication device as claimed in claim 1, wherein the receipt-controlling portion includes:

a signal-arrival judging portion that judges whether the facsimile activation signal arrives within a predetermined time after the instruction input portion receives the user's instruction; and a facsimile-receipt portion that controls the communicating portion to receive facsimile when the facsimile activation signal arrives within the predetermined time.

9. A communication device as claimed in claim 8, wherein the receipt-controlling portion further includes a noise-input resetting portion that, when no facsimile activation signal arrives within the predetermined time, disables the noise-input preventing portion and allows the user's voice to be inputted, thereby allowing the user to resume his/her telephone communication with the remote device when the user inputs no instruction to terminate his/her telephone communication with the remote device.

10. A communication device as claimed in claim 8, wherein the receipt-controlling portion further includes a communication-terminating portion that terminates the telephone communication with the remote device when no facsimile activation signal arrives within the predetermined time and the user inputs his/her instruction to terminate his/her telephone communication with the remote device.

* * * * *